United States Patent [19]

Bootz et al.

[11] Patent Number: 5,591,834
[45] Date of Patent: Jan. 7, 1997

[54] REACTIVE DYESTUFFS HAVING REACTIVE FLUORINE-CONTAINING PYRIMIDYL RADICALS

[75] Inventors: Konrad Bootz, Wetter; Karl-Josef Herd, Odenthal-Holz, both of Germany

[73] Assignee: Bayer Aktiengesellschaft, Leverkusen, Germany

[21] Appl. No.: 363,568

[22] Filed: Dec. 22, 1994

Related U.S. Application Data

[63] Continuation of Ser. No. 6,068, Jan. 15, 1993, abandoned.

[30] Foreign Application Priority Data

Jan. 22, 1992 [DE] Germany ............... 42 01 609.6

[51] Int. Cl.$^6$ ............... C09B 62/20; C09B 62/503; C09B 62/002; D06P 1/38
[52] U.S. Cl. ............... 534/618; 534/617; 534/627; 534/632; 534/633; 534/634; 534/635; 534/636; 534/637; 534/638; 540/125; 540/126; 544/75; 544/76; 544/77
[58] Field of Search ............... 534/617, 618, 534/627, 632–638; 540/125, 126; 544/75–77

[56] References Cited

U.S. PATENT DOCUMENTS

| | | | |
|---|---|---|---|
| 3,718,641 | 2/1973 | Muller et al. | 534/641 |
| 4,515,598 | 5/1985 | Meininger et al. | 8/549 |
| 4,649,193 | 3/1987 | Meininger et al. | 534/622 |
| 4,746,732 | 5/1988 | Tzikas | 534/637 |
| 4,935,501 | 6/1990 | Tzikas | 534/634 |
| 4,996,304 | 2/1991 | Tzikas | 534/637 |
| 5,241,057 | 8/1993 | Jager et al. | 534/632 X |
| 5,319,074 | 6/1994 | Reddig et al. | 534/632 X |

FOREIGN PATENT DOCUMENTS

| | | |
|---|---|---|
| 0167590 | 1/1986 | European Pat. Off. |
| 0443165 | 8/1991 | European Pat. Off. |
| 3800261 | 7/1989 | Germany. |
| 4005121 | 8/1991 | Germany. |
| 2239024 | 6/1991 | United Kingdom. |

OTHER PUBLICATIONS

Derwent Publications, Week 8619, Textiles: Paper: Cellulose, Abstract of JP 61–62566 (Mar. 1986).
Derwent Abstract of JP 42–14,768, JP(A)—F, Textiles; Paper; Cellulose–p. 11, Week 9238, Feb. 15, 1991.

*Primary Examiner*—Fiona T. Powers
*Attorney, Agent, or Firm*—Sprung Horn Kramer & Woods

[57] ABSTRACT

Reactive dyestuffs of the formula

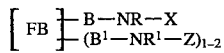

in which Z is a cyano-free pyrimidine reactive group and the remaining groups have the meaning given in the description, are highly suitable for the dyeing and printing of hydroxyl- or amido-containing materials.

5 Claims, No Drawings

REACTIVE DYESTUFFS HAVING REACTIVE FLUORINE-CONTAINING PYRIMIDYL RADICALS

This application is a continuation, of application Ser. No. 08/006,068, filed on Jan. 15, 1993, now abandoned.

The invention relates to new reactive dyestuffs, their preparation and use.

Reactive dyestuffs have already been disclosed in a large number of publications, see DE-A 3,019,960 (U.S. Pat. No. 4,515,598), DE-A-1,922,940 (U.S. Pat. No. 3,718,641), EP-A-167,490, EP-A-133,843 (U.S. Pat. Nos. 4,746,732, 4,935,501, 4,996,304) and EP-A-40,806 (U.S. Pat. No. 4,649,193).

The object of the present invention is to provide improved reactive dyestuffs.

The invention relates to reactive dyestuffs of the formula

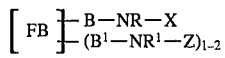

in particular dyestuffs of the formula

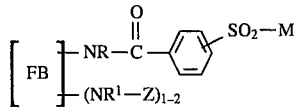

where

X is

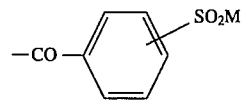

FB is the radical of a dyestuff preferably from the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, B and $B^1$ are each a direct bond or a bridging member to a ring C atom of an aromatic-carbocyclic or to a ring C or ring N atom of an aromatic-heterocyclic ring in FB, M is $CH=CH_2$ or $CH_2CH_2$—V, in which V is OH or a radical which can be eliminated by alkali, for example $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2\text{-}C_6H_4$, $[N(CH_3)_3]^+\text{anion}^-$ or is a substituted or unsubstituted pyridinium radical (substituents are, in particular, substituted or unsubstituted $C_1$–$C_4$-alkyl, COOH, $SO_3H$, CN and carboxamide), Z is a cyano-free fibre-reactive pyrimidine radical and R, $R^1$ are, independently of one another, H, substituted or unsubstituted $C_1$–$C_6$-alkyl, (preferred substituents are halogen, OH, COOH, $SO_3H$ and $OSO_3H$ ), with the exception of the dyestuffs

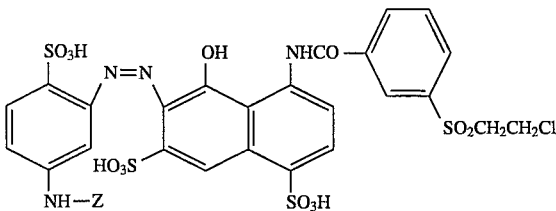

where Z is

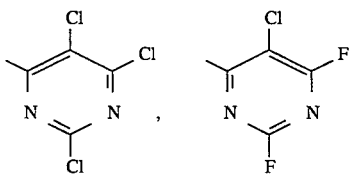

and

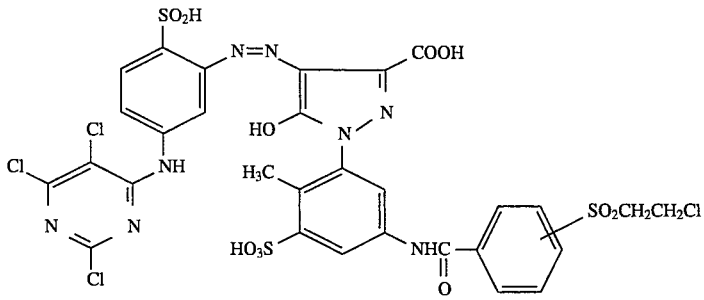

which are disclosed in EP-A 133,843, EP-A 167,490 and DE-A 1,922,940.

Examples of suitable bridging members B and $B^1$, which may be identical or different, are

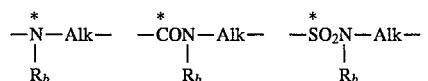

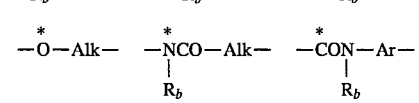

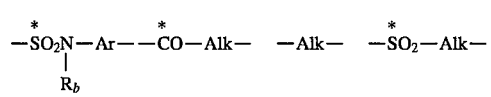

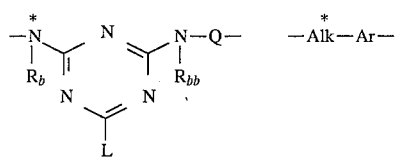

in which the asterisk marks the linkage point with FB, $R_b$ and $R_{bb}$ are, independently of one another, H, $C_1$–$C_6$-alkyl, which may be substituted, in particular by halogen, OH, COOH, $SO_3H$, $OSO_3H$, Alk is straight-chain or branched $C_1$–$C_6$-alkylene, which may be interrupted by hetero atoms or groupings containing hetero atoms such as NR, O or S, Ar is substituted or unsubstituted phenylene or naphthylene or is the radical of a diphenyl or stilbene, Q is Alk or Ar or -Alk-Ar-, it being possible for Alk or Ar to contain further substituents, for example F, Cl, Br, $C_1$–$C_4$-alkyl, $C_1$–$C_4$-alkoxy, carboxyl or sulpho, and L denotes F, Cl, Br, substituted or unsubstituted amino, OH, $C_1$–$C_4$-alkoxy, substituted or unsubstituted phenoxy or $C_1$–$C_4$-alkylthio.

Suitable fibre-reactive radicals Z, i.e. those which react with the OH or NH groups of the fibre under dyeing conditions with the formation of covalent bonds, are mono-, di- or trihalogenopyrimidinyl radicals, such as 2,4-dichloro-6-pyrimidinyl, 2,4,5-trichloro-6-pyrimidinyl, 2,4-dichloro-5-nitro- or -5-methyl- or -5-carboxy-methyl- or -5-carboxy- or -5-vinyl- or -5-sulpho- or -5-mono-, -di- or -trichloromethyl- or -5-carbalkoxy-6-pyrimidinyl, 2,6-dichloro-4-pyrimidinylcarbonyl, 2,4-dichloro-5-pyrimidinylcarbonyl, 2-chloro-4-methyl-5-pyrimidinylcarbonyl, 2-methyl-4-chloro-5-pyrimidinylcarbonyl, 2-methylthio-4-fluoro-5-pyrimidinylcarbonyl, 6-methyl-2,4-dichloro-5-pyrimidinylcarbonyl, 2,4,6-trichloro-5-pyrimidinylcarbonyl, 2,4-dichloro-5-pyrimidinylsulphonyl and the corresponding bromine and fluorine derivatives of the abovementioned chloro-substituted heterocyclic radicals, of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 5-chloro-6-fluoro-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonylpyrimidin-6-yl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl-containing pyrimidine rings, such as 2-carboxymethylsulphonyl-4-pyrimidinyl, 2-methylsulphonyl-6-methyl-4-pyrimidinyl, 2-methylsulphonyl-6-ethyl-4-pyrimidinyl, 2-phenylsulphonyl-5-chloro-6-methyl-4-pyrimidinyl, 2,6-bis-methylsulphonyl-4-pyrimidinyl, 2,6-bis-methylsulphonyl-5-chloro-4-pyrimidinyl, 2,4-bis-methylsulphonyl-pyrimidine-5-sulphonyl, 2-methylsulphonyl-4-pyrimidinyl, 2-phenylsulphonyl-4-pyrimidinyl, 2-trichloromethylsulphonyl-6-methyl-4-pyrimidinyl, 2-methylsulphonyl-5-chloro-6-methyl-4-pyrimidinyl, 2-methylsulphonyl-5-bromo-6-methyl-4-pyrimidinyl, 2-methylsulphonyl-5-chloro-6-ethyl-4-pyrimidinyl, 2-methylsulphonyl-5-chloro-6-chloromethyl-4-pyrimidinyl, 2-methylsulphonyl-4-chloro-6-methylpyrimidine-5-sulphonyl, 2-methylsulphonyl-5-nitro-6-methyl-4-pyrimidinyl, 2,5,6-tris-methylsulphonyl-4-pyrimidinyl, 2-methylsulphonyl-5,6-dimethyl-4-pyrimidinyl, 2-ethylsulphonyl-5-chloro-6-methyl-4-pyrimidinyl, 2-methylsulphonyl-6-chloro-4-pyrimidinyl, 2,6-bis-methylsulphonyl-5-chloro-4-pyrimidinyl, 2-methylsulphonyl-6-carboxy-4-pyrimidinyl, 2-methylsulphonyl-5-sulpho-4-pyrimidinyl, 2-methylsulphonyl-6-carbomethoxy-4-pyrimidinyl, 2-methylsulphonyl-5-carboxy-4-pyrimidinyl, 2-methylsulphonyl-5-cyano-6-methoxy-4-pyrimidinyl, 2-methylsulphonyl-5-chloro-4-pyrimidinyl, 2-β-sulphoethylsulphonyl-6-methyl-4-pyrimidinyl, 2-methylsulphonyl-5-bromo-4-pyrimidinyl, 2-phenylsulphonyl-5-chloro-4-pyrimidinyl, 2-carboxymethylsulphonyl-5-chloro-6-methyl-4-pyrimidinyl, 2-methylsulphonyl-6-chloro-pyrimidine-4- or -5-carbonyl, 2,6-bis(methylsulphonyl)-4- or -5-pyrimidylcarbonyl, 2-ethylsulphonyl-6-chloro-5-pyrimidylcarbonyl, 2,4-bis-(methylsulphonyl)-5-pyrimidylsulphonyl, 2-methylsulphonyl-4-chloro-6-methyl-5-pyrimidylsulphonyl or -carbonyl.

Preference is given to reactive dyestuffs of the formula (1) in which FB is the radical of a mono- or disazo dyestuff or of a metal complex azo dyestuff.

In this case, the radicals —B—N(R)—X and —B¹—N(R¹)—Z are bound to different or identical radicals of starting components, i.e. diazo and coupling components (D and K). The radicals —B—N(R)—X and —B¹—N(R¹)—Z are preferably bound to one component each, diazo component or coupling component. The reactive dyestuffs then have, for example, the formula

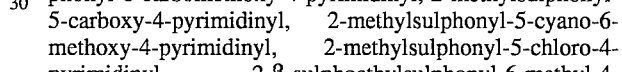 (1b)

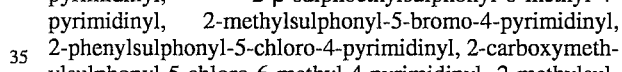 (1c)

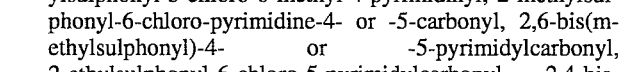 (1d)

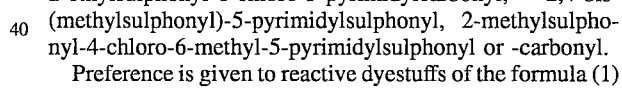 (1e)

in which —K— in formulae (1d) and (1e) represents the radical of a dicoupling coupling component.

If both radicals —B—N(R)—X and —B¹—N(R¹)—Z are bound to the same radical of a starting component D or K, this radical is in particular the radical of the coupling component K. The reactive dyestuffs then have the formula

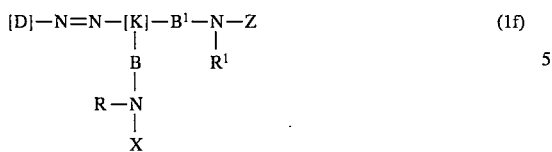

(1f)

in which

D, $D_1$, $D_2$ are the radical of a diazo component from the benzene or naphthalene series, K is the radical of a coupling component from the benzene, naphthalene, acetoacetic arylide or heterocyclic series; in the heterocyclic series, it is preferably a pyrazolone or pyridone radical.

In the series of amino-hydroxynaphthalene-disulphonic acids, preference is given to 1-amino-8-hydroxynaphthalene-2,4-disulphonic acid, 2-hydroxy-3-aminonaphthalene-5,7-disulphonic acid, 2-amino-5-hydroxynaphthalene-1,7-disulphonic acid, 2-amino-8-hydroxynaphthalene-3,6-disulphonic acid and 1-amino-8-hydroxynaphthalene-3,6-disulphonic acid.

The radicals D, $D_1$, $D_2$ and K can be substituted by further azo groups or by radicals containing azo groups. X, Z, B, $B^1$, R and $R^1$ have the abovementioned meanings.

Examples of D, $D_1$ and $D_2$ are preferably phenyl or phenylene which is unsubstituted or substituted by $SO_3H$, chlorine, $C_1-C_4$-alkoxy, $C_1-C_4$-alkyl, carbalkoxy or sulphonamido, naphthyl or naphthylene which is unsubstituted or substituted by $SO_3H$, chlorine, $C_1-C_4$-alkoxy or $C_1-C_4$-alkyl, 4-(phenylazo)phenyl which is unsubstituted or substituted by $SO_3H$ and biphenylene which is unsubstituted or substituted by $SO_3H$.

K represents, for example, the radical of a coupling component from the hydroxybenzene, hydroxynaphthalene, aminobenzene, aminonaphthalene, aminohydroxynaphthalene series, a 5-hydroxy-3-methyl (or carboxy)-pyrazolone, a 6-hydroxy-2-pyridone or an acetoacetic arylide radical which is unsubstituted or ring-substituted by $C_1-C_4$-alkyl or $C_1-C_4$-alkoxy.

K can contain the customary substituents, in particular sulpho groups.

Furthermore, reactive dyestuffs of the formula (1b) to (1f), in which the radicals D, $D_1$, $D_2$ and K can contain a further reactive radical, are also suitable. Accordingly, tri- and tetrafunctionally fibre-reactive dyestuffs are also included. The additional reactive radicals included in D or K can, like Z and X, be bound to D or K via amino groups or in a different manner, for example via a direct bond. The above statements apply analogously also to the metal complexes of mono- and disazo dyestuffs (1b–1f).

Particular preference is given to reactive dyestuffs according to the invention of the formula (1) or (1a)–(1f) in which Z is a fluorine-containing pyrimidinyl radical and M represents $CH=CH_2$ or $CH_2CH_2Cl$.

Furthermore, particular preference is given to the dyestuffs according to the invention in which Z represents

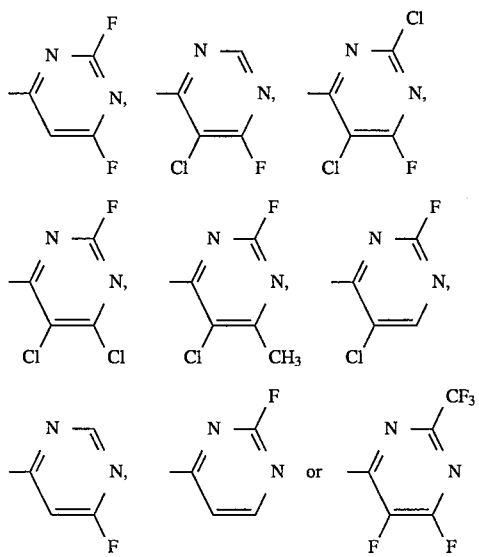

Preference is given to reactive dyestuffs of the formula

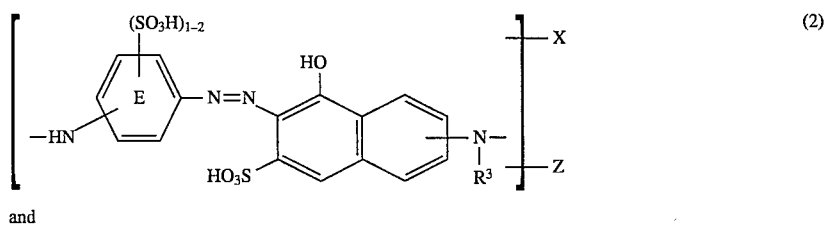

(2)

and

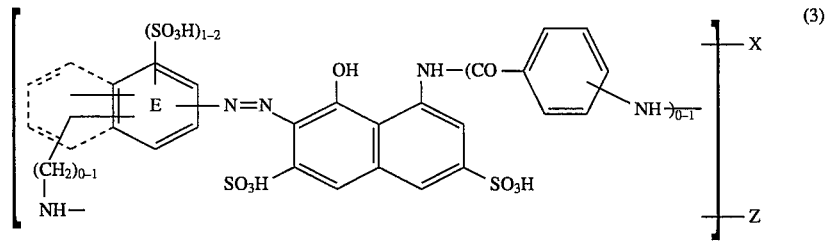

(3)

in which X and Z have the abovementioned meaning, $R^3$ is hydrogen, methyl or ethyl, and the benzene ring E may be further substituted. Examples of substituents for the ring E are $CH_3$, $C_2H_5$, $CH_3O$, $C_2H_5O$, halogen or $CO_2H$.

Preference is given in particular to reactive dyestuffs of the formula (2) in which the benzene ring E is not further substituted and to reactive dyestuffs of the formula (3) in which the benzene ring E is not further substituted.

Furthermore, preference is given to reactive dyestuffs of the formula

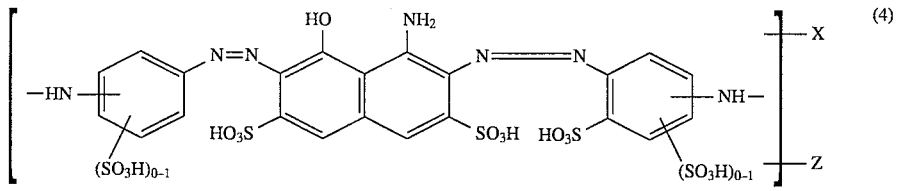
(4)

In addition to the reactive dyestuffs described above of the formulae (2), (3) and (4), further valuable representatives are the reactive dyestuffs of the following formulae:

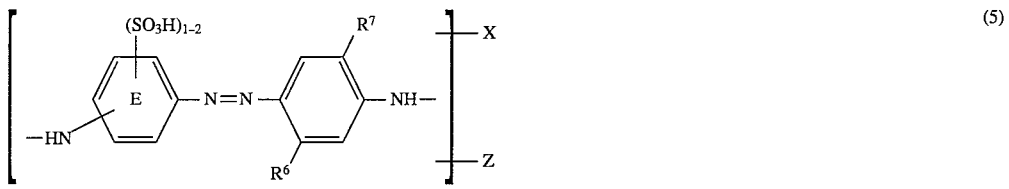
(5)

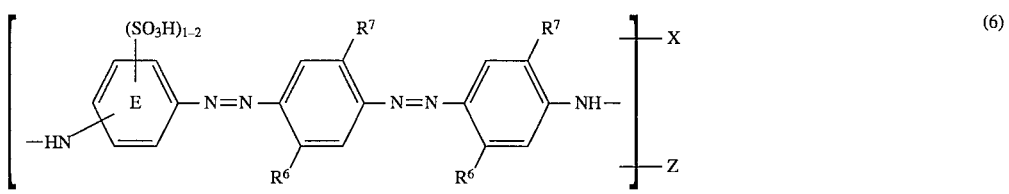
(6)

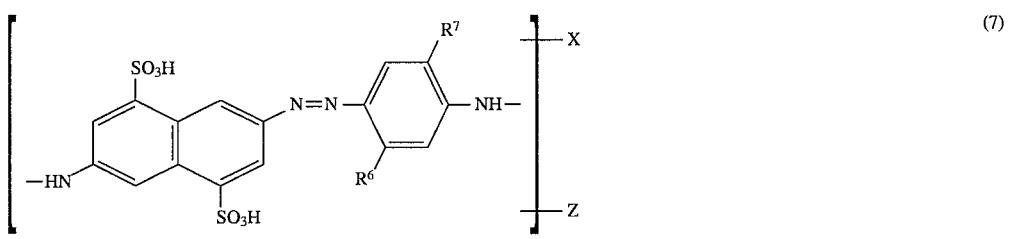
(7)

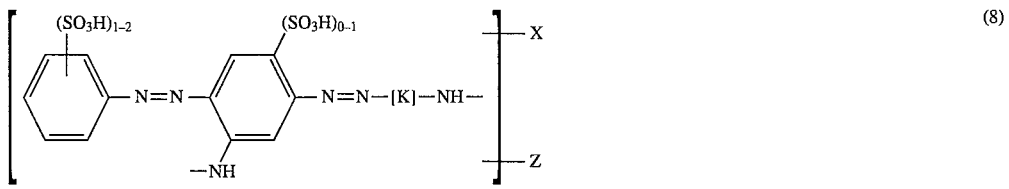
(8)

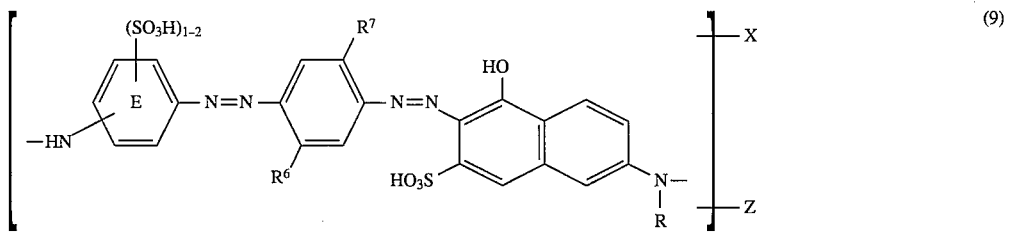
(9)

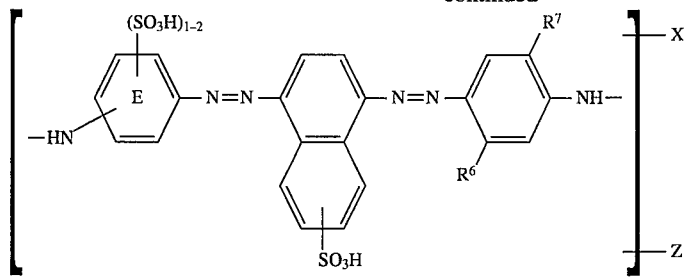
(10)
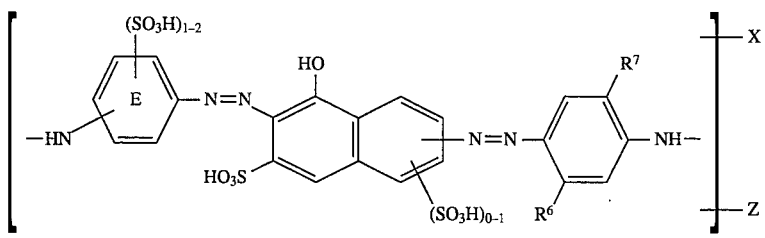
(11)
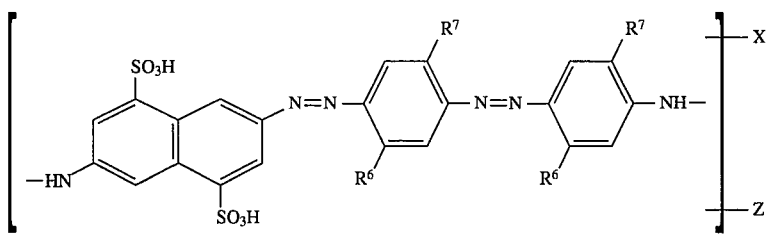
(12)
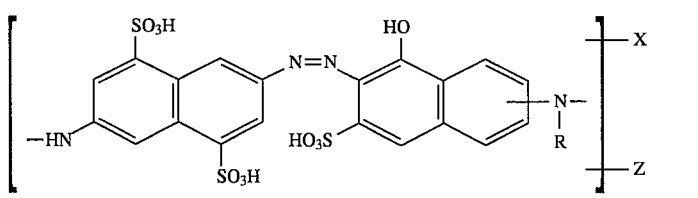
(13)
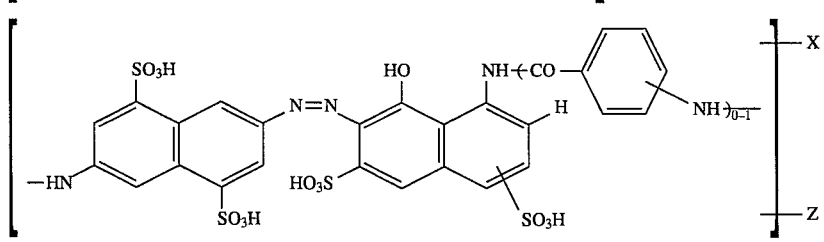
(14)
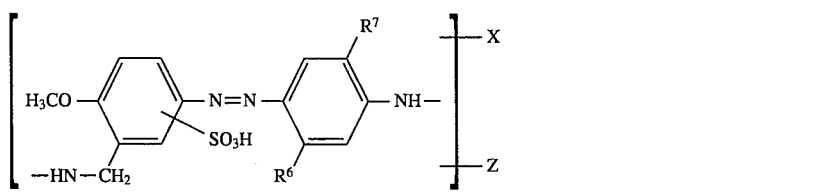
(15)
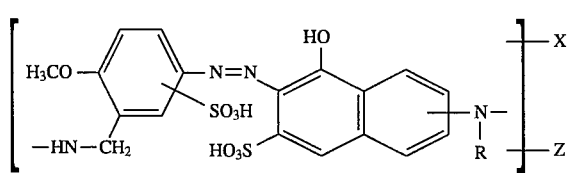
(16)

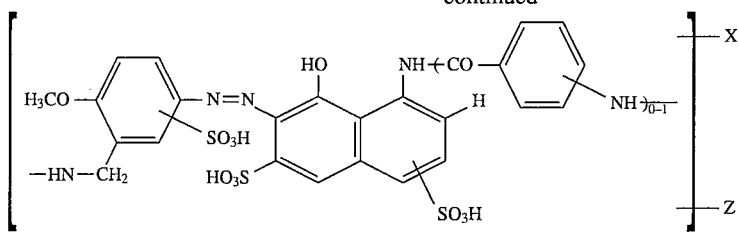
(17)
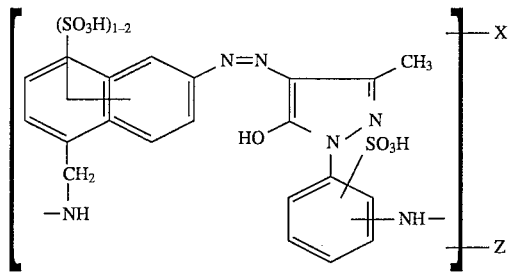
(18)
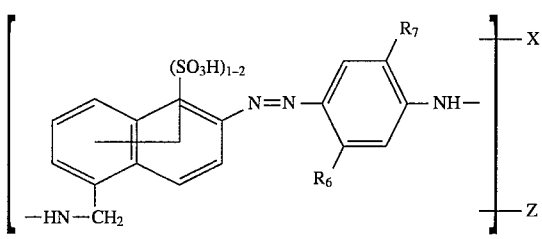
(19)
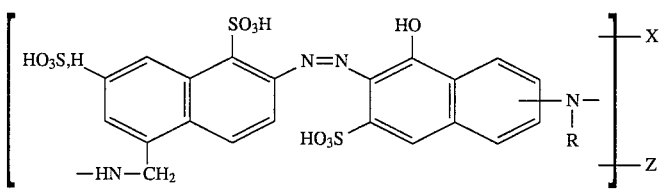
(20)
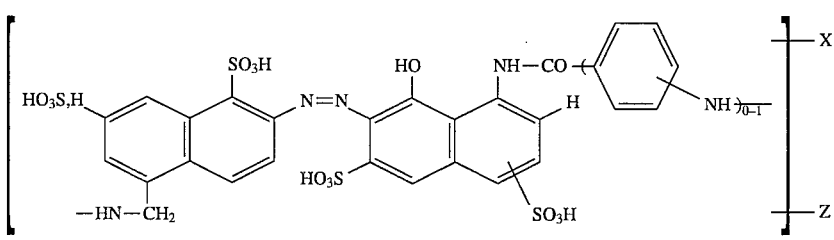
(21)
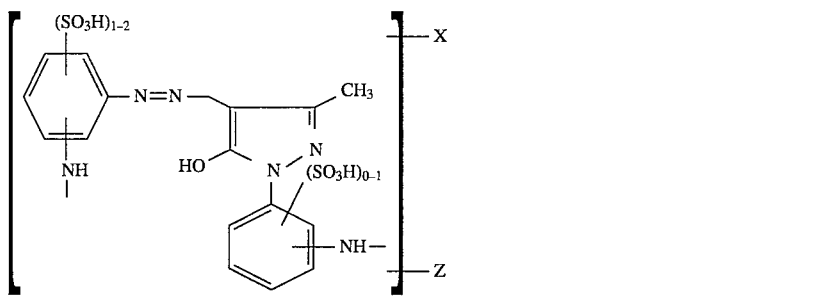
(22)
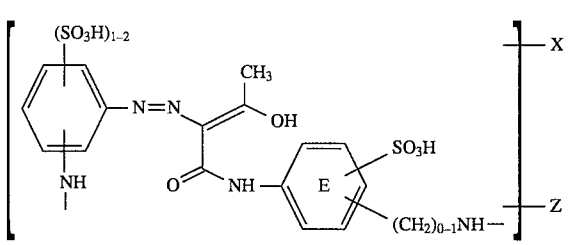
(23)

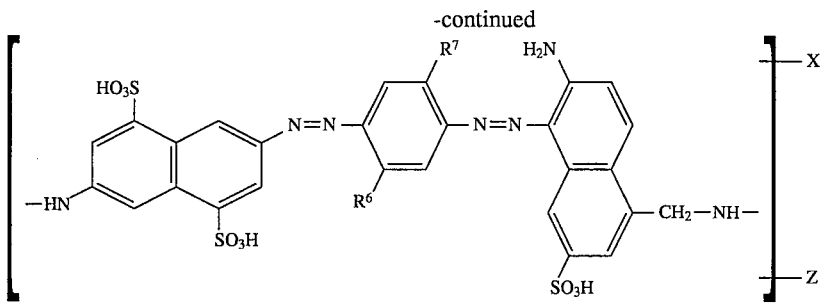 (24)
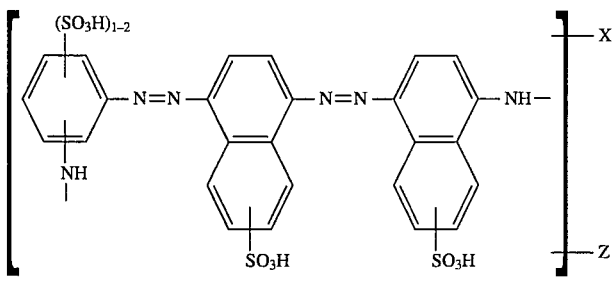 (25)
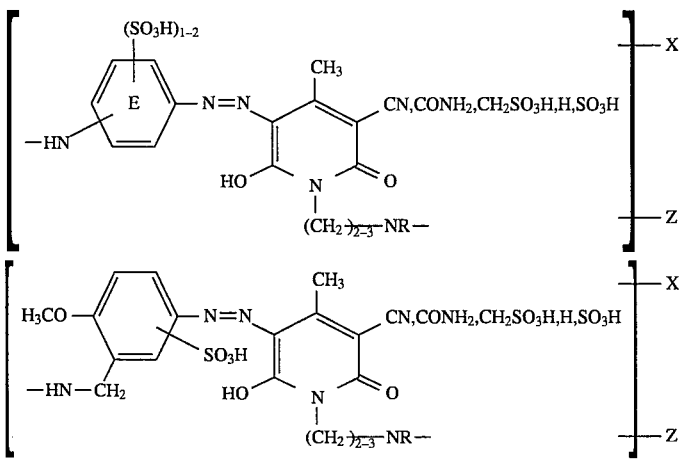 (26)
(27)
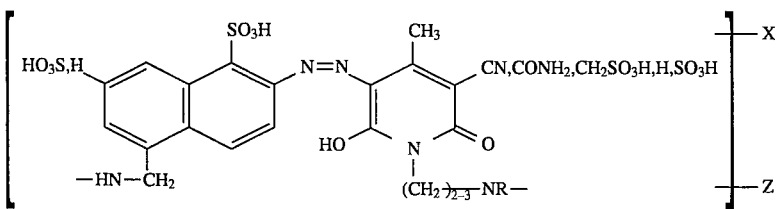 (28)
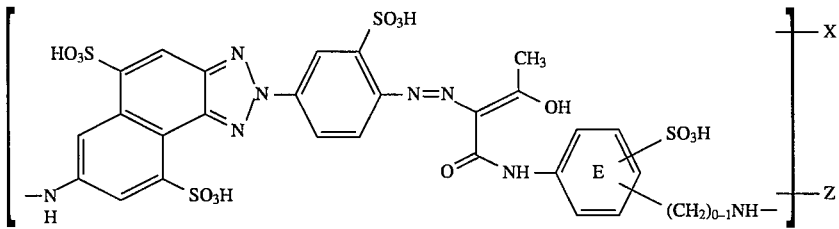 (29)
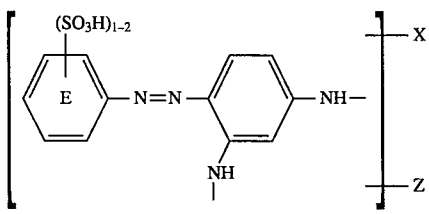 (30)

-continued
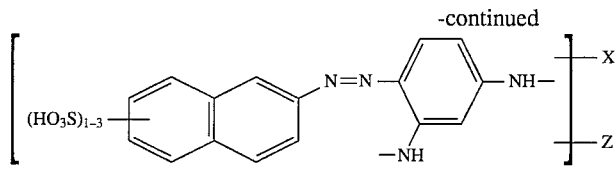 (31)
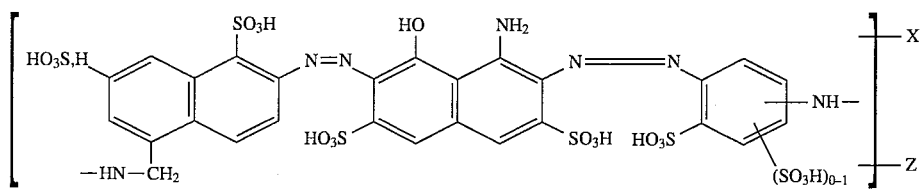 (32)
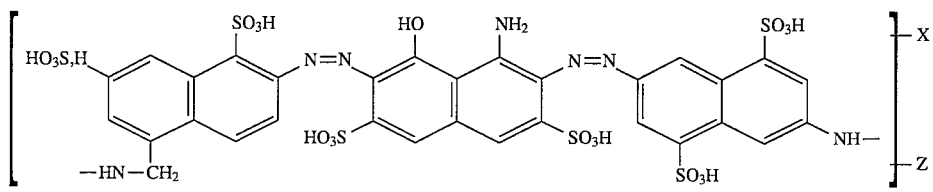 (33)
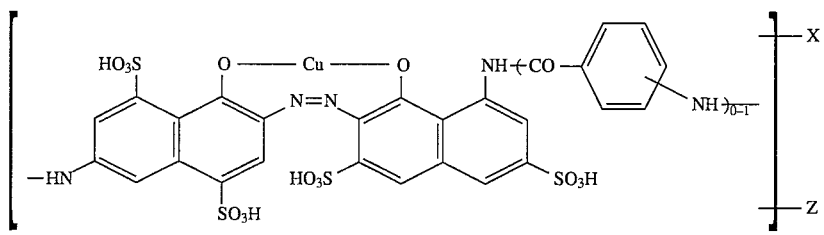 (34)
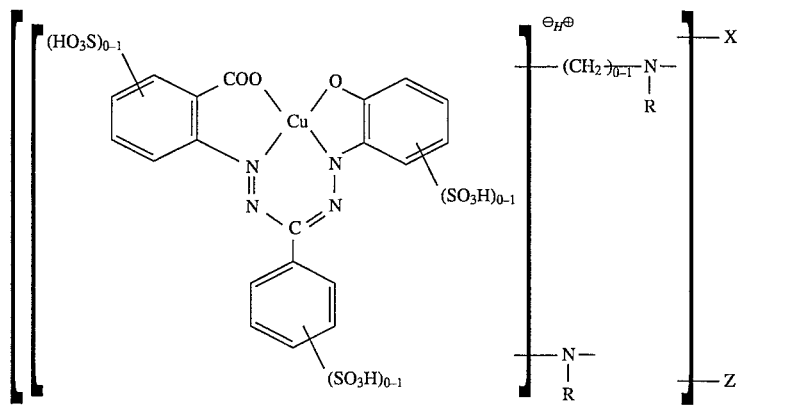 (35)
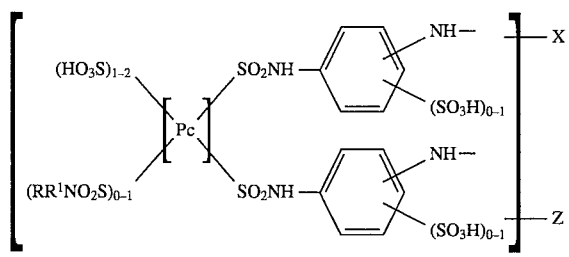 (36)
in which Pc represents a Cu phthalocyanine or Ni phthalocyanine radical and the total number of substituents on the Pc skeleton is at most 4;

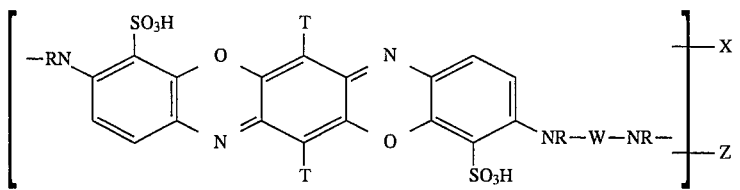 (37)

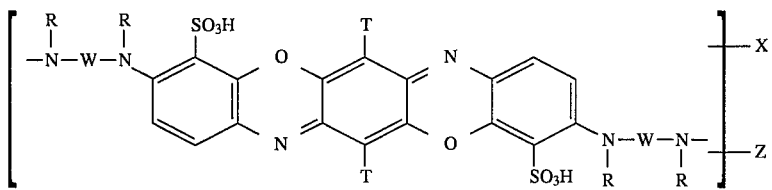 (38)

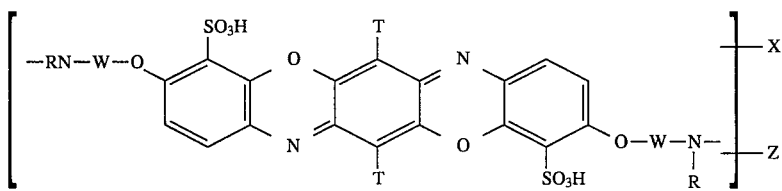 (39)

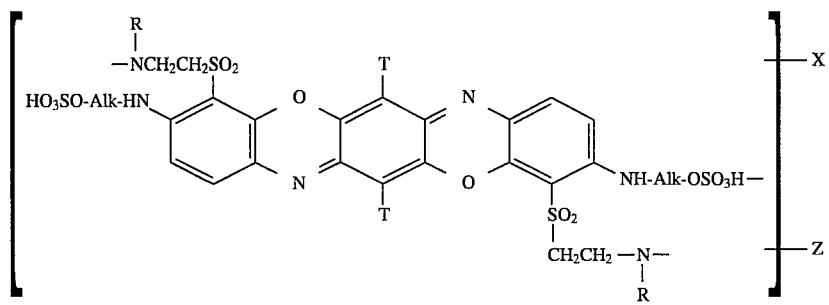 (40)

in which T is Cl, Br, OCH₃ and Z, K, E, R, X and Alk have the abovementioned meanings, $R^6$ is H, $C_1$–$C_4$-alkyl, $C_1$–$C_4$-alkoxy, acylamino, in particular $C_1$–$C_4$-alkylcarbonylamino, $C_1$–$C_4$-alkylsulphonylamino, aminocarbonylamino, substituted or unsubstituted phenylcarbonylamino, Cl, Br, $R^7$ is H, $C_1$–$C_4$-alkyl, $C_1$–$C_4$-alkoxy, OH, SO₃H, W is an aliphatic bridging member, in particular $C_2$–$C_4$-alkylene.

In the preferred reactive dyestuffs of the formulae (9), (10), (11), (26) and (30), the benzene rings E are preferably not further substituted either; the diazo components used in this case are in particular 1,3-phenylenediamine-4-sulphonic acid, 1,4-phenylenediamine-2-sulphonic acid, 1,4-phenylenediamine-2,5-disulphonic acid or 1,3-phenylenediamine-4,6-disulphonic acid.

In a preferred embodiment, X denotes

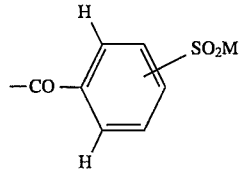

where M is CH=CH₂ or CH₂CH₂Cl.

Preference is given in particular to reactive dyestuffs of the formulae (2) to (40) in which Z is a fluorine-containing pyrimidyl radical and the second reactive radical X represents (2-chloroethylsulphonyl)-benzoyl, such as, for example, dyestuffs of the formula (41)

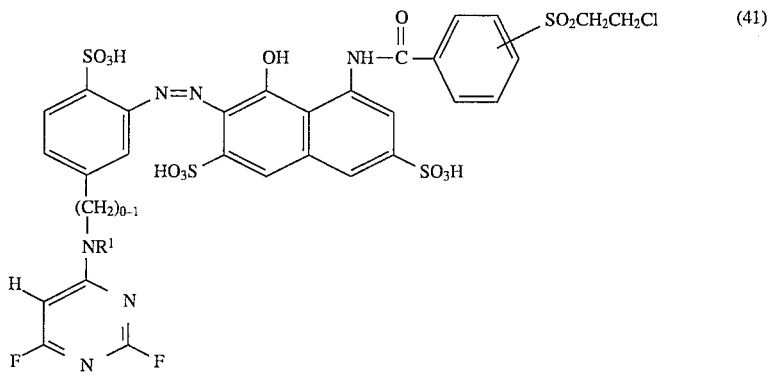

(41)

A process for preparing the dyestuffs (1) consists in reacting dyestuff bases of the formula (III)

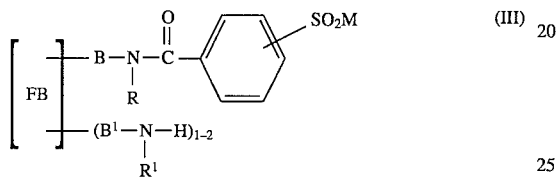

or the corresponding dyestuff precursors with a reactive component

Z - Hal  (IV)

in which
Hal is Cl, Br or F,
or reacting dyestuff bases of the formula (V)

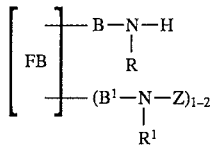

or the corresponding dyestuff precursors with a reactive component

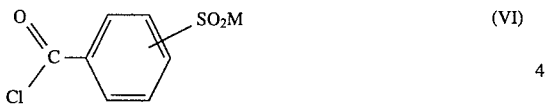

and then converting the resulting products, in the case where precursors were used, into the desired final dyestuffs, followed, if desired, by further conversion reactions.

When the preferred azo dyestuffs are prepared, the diazo components and the coupling components together must contain two amino groups —N(R)H and —N(R')H and may contain further acylatable amino groups. It is possible to use suitable acetylamino or nitro compounds whose acetylamino or nitro group is converted by hydrolysis or reduction into the $NH_2$ group before carrying out the condensation using a halogenotriazine, halogenopyrimidine or the like. The reactive radicals X and Z are introduced by condensation of dyestuffs or dyestuff precursors containing acylatable amino groups, using fibre-reactive halogenated acylating agents. When the final dyestuffs are prepared from precursors, this is done in most cases by coupling reactions which result in azo dyestuffs.

Since the individual abovementioned process steps can be carried out in a different order, various process variants are possible. In general, the reaction is carried out stepwise in succession, the order of the simple reactions between the individual reaction components advantageously depending on the particular conditions. Since, under certain conditions, hydrolysis of the vinylsulphonyl or halogenopyrimidinyl radical or the like takes place, an intermediate containing acetylamino groups has to be hydrolysed in order to cleave off the acetyl groups before it is condensed with a (2-chloroethylsulphonyl)benzoyl chloride or fluoropyrimidine or the like. The most important process variants are described in the exemplary embodiments.

Examples of suitable starting compounds for the preparation of mono- or polyazo dyestuffs (1) are:
Diazo components (D, $D_1$ and $D_2$)
1,3-Diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxy-benzidine, 2,2'-dimethylbenzidine, 4,2'-diaminodiphenyl (diphenyline), 2,6-diaminonaphthalene-4,8-disulphonic acid, 1,4-diaminobenzene-2-sulphonic acid, 1,4-diaminobenzene-2,5-disulphonic acid, 1,4-diaminobenzene-2,6-disulphonic acid, 1,3-diaminobenzene-4-sulphonic acid, 1,3-diaminobenzene-4,6-disulphonic acid, 1,4-diamino-2-chlorobenzene-5-sulphonic acid, 1,4-diamino-2-methylbenzene-5-sulphonic acid, 1,5-diamino-6-methylbenzene-3-sulphonic acid, 1,3-diamino-6-methylbenzene-4-sulphonic acid, 3-(3'- and 4'-aminobenzoylamino)-1-aminobenzene-6-sulphonic acid, 1-(4'-aminobenzoylamino)-4-aminobenzene-2,5-disulphonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diamino-2,2'-disulphodiphenylurea, 4,4'-diamino-2,2'-disulphodiphenoxyethane, 4,4'-diaminostilbene-2,2'-disulphonic acid, 4,4'-diamino-2,2'-disulphodiphenylethane, 2-amino-5-aminomethylnaphthalene-1-sulphonic acid, 2-amino-5-aminomethylnaphthalene-1,7-disulphonic acid, 1-amino-4-methoxy-5-aminomethylbenzene-6-sulphonic acid.

If an aminoacetylamino compound, from which the acetyl group is to be cleaved off afterwards by hydrolysis, such as described above in the discussions of the process variants, is to be used as the diazo component instead of a diamine, suitable compounds are the monoacetyl compounds of the abovementioned diazo components, for example 1-acetylamino-3-aminobenzene-4-sulphonic acid or 1-acetylamino-4-aminobenzene-3-sulphonic acid.

If the two radicals —B—N(R)—X and —B$^1$—N(R$^1$)—Z in formula (1) are bound to the same component, for example the coupling component, such as described above, the diazo components can also be those which do not contain any acylatable amino group apart from the amino group to be diazotised, such as, for example, aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulphonamide, 1-aminobenzene-2-, -3- or -4-sulphonic acid, 1-aminobenzene-2,4- and -2,5-disulphonic acid, 1-amino-4-methylbenzene-2-sulphonic acid, 1-amino-3-methylbenzene-6-sulphonic acid, 1-amino-6-methylbenzene-3- or -4-sulphonic acid, 1-aminonaphthalene, 2-aminonaphthalene, 1-aminonaphthalene-2-, -4-, -5-, -6-, -7- or -8-sulphonic acid, 2-aminonaphthalene-1-, -3-, -4-, -5-, -6-, -7- or -8-sulphonic acid, 1-aminonaphthalene-3,6- or -5,7-disulphonic acid, 2-aminonaphthalene-1,5-, -1,7-, -3,6-, -5,7-, -4,8- or -6,8-disulphonic acid, 1-aminonaphthalene-2,5,7-trisulphonic acid, 2-aminonaphthalene-1,5,7-, -3,6,8- or -4,6,8-trisulphonic acid, 4-aminoazobenzene-3,4'-disulphonic acid, 3-methoxy-4-amino-6-methylazobenzene-2',4'-disulphonic acid or 3-methoxy-4-amino-6-methylazobenzene-2',5'-disulphonic acid.

COUPLING COMPONENTS (K)

1-Amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulphonic acid, 1-aminonaphthalene-6- or -8-sulphonic acid, 1-amino-2-methoxynaphthalene-6-sulphonic acid, 2-aminonaphthalene-5,7-disulphonic acid, 1-amino-8-hydroxynaphthalene-6-sulphonic acid, 1-amino-8-hydroxynaphthalene-2,4-disulphonic acid, 2-hydroxy-3-aminonaphthalene-5,7-disulphonic acid, 1-amino-8-hydroxynaphthalene-2,4,6-trisulphonic acid, 1-hydroxy-8-acetyl aminonaphthalene-3-sulphonic acid, 1-benzoylamino-8-hydroxynaphthalene-3,6- or -4,6-disulphonic acid, 2-benzoylamino-5-hydroxynaphthalene-7-sulphonic acid, 2-amino-5-hydroxynaphthalene-7-sulphonic acid, 2-methyl- and 2-ethylamino-5-hydroxynaphthalene-7-sulphonic acid, 2-(N-acetyl-N-methylamino)-5-hydroxynaphthalene-7-sulphonic acid, 2-acetylamino-5-hydroxynaphthalene-7-sulphonic acid, 2-amino-5-hydroxynaphthalene-1,7-disulphonic acid, 2-amino-8-hydroxynaphthalene-6-sulphonic acid, 2-methyl- and 2-ethylamino-8-hydroxynaphthalene-6-sulphonic acid, 2-(N-acetyl-N-methylamino)-8-hydroxynaphthalene-6-sulphonic acid, 2-acetylamino)-8-hydroxynaphthalene-6-sulphonic acid, 2-amino-8-hydroxynaphthalene-3,6-disulphonic acid, 2-acetylamino-8-hydroxynaphthalene-3,6-disulphonic acid, 1-amino-5-hydroxynaphthalene-7-sulphonic acid, 1-amino-8-hydroxynaphthalene-3,6-disulphonic acid, 1-acetylamino-8-hydroxynaphthalene-3,6- and -4,6-disulphonic acid, 1-(4'-aminobenzoylamino)-8-hydroxynaphthalene-3,6- and -4,6-disulphonic acid, 1-(4'-nitrobenzoylamino)-8-hydroxynaphthalene-3,6-disulphonic acid, 1-(3'-aminobenzoylamino)-8-hydroxynaphthalene-3,6- and -4,6-disulphonic acid, 1-(3'-nitrobenzoylamino)-8-hydroxynaphthalene-3,6- and -4,6-disulphonic acid, 2-(4'-amino-3'-sulphophenylamino)-5-hydroxynaphthalene-7-sulphonic acid, 1-amino-8-hydroxynaphthalene-4-sulphonic acid, 2,4,6-triamino-3-cyanopyridine, 1-β-aminoethyl-3-cyano-4-methyl-6-hydroxy-2-pyridone, 1-γ-aminopropyl-3-sulphomethyl-4-methyl-6-hydroxy-2-pyridone, 1,3-diaminobenzene.

Diazotisation of the diazo components or of the intermediates containing a diazotisable amino group is usually carried out by reaction with nitrous acid in aqueous mineral acid solution at low temperature. The coupling onto the coupling component takes place at a strongly acidic, neutral to weakly alkaline pH.

The condensation of the reactive components with the diazo components and the coupling components and with the amines or the acylatable.monoazo or disazo intermediates or with the amino-containing dyestuffs is preferably carried out in aqueous solution or suspension, at low temperature and at a weakly acidic, neutral to weakly alkaline pH. Advantageously, the hydrogen halide released during condensation is continuously neutralised by addition of aqueous alkali metal hydroxides, alkali metal carbonates or alkali metal bicarbonates.

The formulae given are those of the free acids. During the preparation, the salts are usually obtained, in particular the alkali metal salts such as sodium salts, potassium salts or lithium salts. The dyestuffs can also be used as concentrated solutions.

The dyestuffs according to the invention are highly suitable for the dyeing and printing of natural and synthetic OH- or amido-containing materials, in particular those made of cellulose and polyamides. They are particularly suitable for the dyeing of cellulose materials by the exhaust and cold pad-batch methods, and for the printing of cotton and staple viscose.

The dyeings obtained build up well with high degrees of fixation and have good general fastness properties, in particular wet fastness properties.

DYEING PROCEDURES

The dyeings described in the examples which follow are carried out under the following conditions:

Dyeing Procedure 1

2 parts of the dyestuff are dissolved in 100 ml of water. The solution is added to 1900 parts of cold water, 60 parts of sodium chloride are added, and this dyebath is entered with 100 parts of a cotton fabric.

The temperature is increased to 50° C., and 40 parts of calcined sodium carbonate and another 60 parts of sodium chloride are added after 30 minutes. The temperature is maintained at 50° C. for 30 minutes, the dyeing is soaped for 15 minutes in a 0.3% strength boiling solution of a non-ionic detergent, rinsed and dried.

Dyeing Procedure 2

4 parts of the reactive dyestuff are dissolved in 50 parts of water. To this solution are added 50 parts of a solution containing 5 g of sodium hydroxide and 10 g of calcined sodium carbonate per liter. The solution obtained is used to pad a cotton fabric in such a manner that its liquor pickup is 70%, and the fabric is then wound onto a batching roller. The cotton fabric is left in this manner at room temperature for 3 to 12 hours. The dyed material is then rinsed, soaped at the boil for a quarter of an hour using a non-ionic detergent, rinsed again and dried.

EXAMPLE 1 a) 0.2 mol of 1-amino-8-hydroxynaphthalene-3,6-disulphonic acid is dissolved in 450 ml of water at a pH of 8–9 using sodium hydroxide solution, and 0.22 mol of 2,4,6-trifluoropyrimidine is added. The condensation takes place at 35°–40° C., the pH being maintained with sodium carbonate solution.

b) 0.2 mol of 3-[4'-(2-chloroethylsulphonyl)-benzoylamino]-aniline-6-sulphonic acid (prepared from 2,4-diaminobenzenesulphonic acid and 4-(2-chloroethylsulphonyl)-benzoyl chloride) is suspended in water, and 65 ml of 30% strength hydrochloric acid and 300 g of ice are added. 46 ml of 30% strength sodium nitrite solution are then added, and the mixture is stirred at 0° C. for 1 hour. Excess sodium nitrite is destroyed with sulphamic acid, and the diazotisation solution thus obtained is added to the solution of the coupling component a). The pH is brought to 6–7 with sodium carbonate solution.

After coupling is complete, the dyestuff is salted out, isolated, dried and milled. The dyestuff thus obtained of the formula 0.2 mol of the diazonium salt from Example 1 is now added, while maintaining the pH at the same time at 7.5–8 by dropwise addition of sodium carbonate solution (20 g/100 ml). After coupling is complete, the product is salted out with NaCl, isolated and dried. The dyestuff of the formula

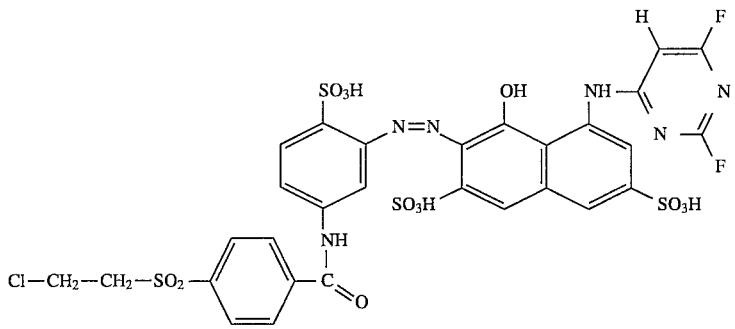

dyes cotton in red hues.

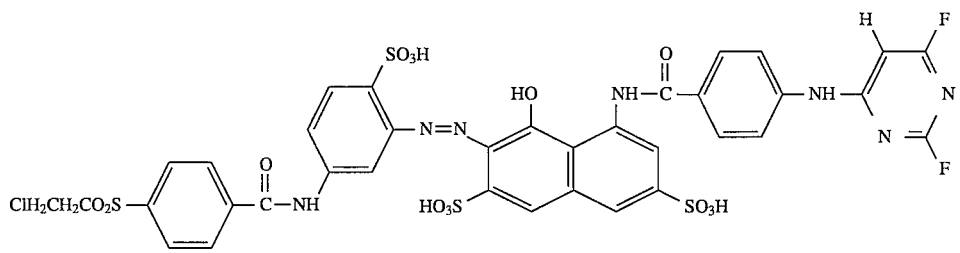

EXAMPLE 2

0.2 mol of 8-(4'-amino-benzoylamino)-1-naphthol-3,6-disulphonic acid is dissolved in 800 ml of water at a pH of 7 using sodium carbonate solution (20 g/100 ml). The pH is brought to 4.5 with 10% strength HCl solution. 0.22 mol of 2,4,6-trifluoropyrimidine is added, and the mixture is heated to 30° C. The pH is maintained at 4.5–6 with sodium carbonate solution (20 g/100 ml). Reaction is complete after 4 hours.

dyes cotton in red hues.

EXAMPLES 3–37 OF THE FORMULA $$X-[-D-]-N=N-[-K-]-Z$$

can be prepared as described in Example 1 or 2 by using the corresponding intermediates. They dye cotton in the hues given.

X has the meaning given in formula (1) or $X^1$ is

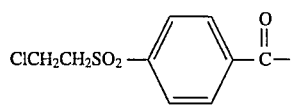

$X^2$ is

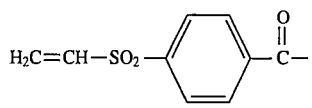

$X^3$ is

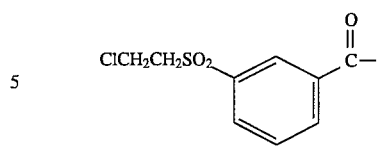

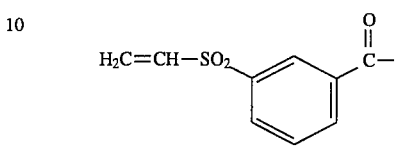

| | Diazo component | Coupling component | Z | Hue |
|---|---|---|---|---|
| 3 | 2-amino-5-(X¹-NH)-4-methylbenzenesulfonic acid (SO₃H, NH₂, H₃C, X¹—NH) | 8-hydroxy-5-(NH—Z)-2-methylnaphthalene-3,7-disulfonic acid (OH, NH—Z, HO₃S, SO₃H, CH₃) | chloro-fluoro-pyrimidinyl (N=CH, N, Cl, F) | Red |
| 4 | 2-amino-5-(X¹-NH)benzenesulfonic acid (SO₃H, NH₂, X¹—NH) | 8-hydroxy-5-(NH—Z)-2-methylnaphthalene-3,7-disulfonic acid | same | Red-violet |
| 5 | 2-amino-4-[(X²-N(CH₃))CH₂]benzenesulfonic acid | " | " | Red |
| 6 | 2-amino-5-[(X¹-HN)CH₂]naphthalene-1-sulfonic acid | " | " | Bluish red |
| 7 | 2-amino-4-[(X⁴-N(CH₃))CH₂]benzenesulfonic acid | 4-hydroxy-8-(NH—Z)-3-methylnaphthalene-5,7-disulfonic acid (OH, NH—Z, SO₃H, SO₃H) | same | Red |
| 8 | 2-amino-5-[(X³-HN)CH₂]naphthalene-1-sulfonic acid | " | " | Red |

-continued

| | Diazo component | Coupling component | Z | Hue |
|---|---|---|---|---|
| 9 | 2-amino-4-(X¹-HN)-benzene-1,5-disulfonic acid structure | " | " | Bluish red |
| 10 | 2-amino-4-(X¹-NH)-benzenesulfonic acid structure | 8-amino-1-hydroxy-2-methyl-naphthalene-3,5-disulfonic acid with NH-Z | chloro-fluoro-pyrimidine | Red |
| 11 | 2-amino-4-(X¹-NH)-benzenesulfonic acid structure | 6-(NH-Z)-1-hydroxy-2-methyl-naphthalene-3-sulfonic acid | " | Scarlet |
| 12 | 2-amino-4-(X³-N(CH₃)-CH₂-)-benzenesulfonic acid structure | " | " | Orange |
| 13 | 2-amino-4-(X³-HN)-benzene-1,5-disulfonic acid structure | 6-(NH-Z)-1-hydroxy-2-methyl-naphthalene-3-sulfonic acid | chloro-fluoro-pyrimidine | Red |
| 14 | 2-amino-4-(X¹-NH)-benzenesulfonic acid structure | 6-(NH-Z)-1-hydroxy-2-methyl-naphthalene-3-sulfonic acid | " | Orange |
| 15 | 2-amino-4-(X¹-NH)-benzenesulfonic acid structure | 6-(N(CH₃)-Z)-1-hydroxy-2-methyl-naphthalene-3-sulfonic acid | chloro-difluoro-pyrimidine | Orange |
| 16 | 2-amino-4-(X³-NH)-benzenesulfonic acid structure | 8-(NH-CO-C₆H₄-NH-Z)-1-hydroxy-2-methyl-naphthalene-3,5-disulfonic acid | chloro-fluoro-pyrimidine | Bluish red |

-continued
| | Diazo component | Coupling component | Z | Hue |
|---|---|---|---|---|
| 17 | 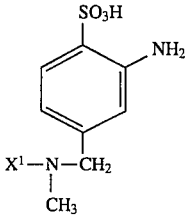 | " | " | Red |
| 18 | 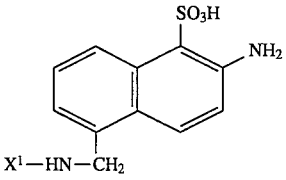 | " | 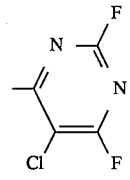 | Red |
| 19 | 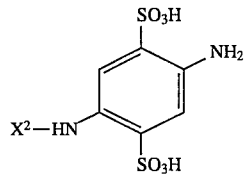 | 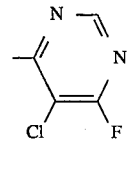 | 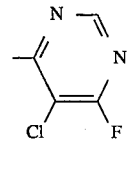 | Bluish red |
| 20 | 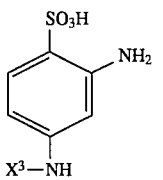 |  | " | Red |
| 21 | 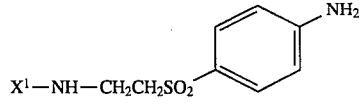 |  | " | Red |
| 22 | 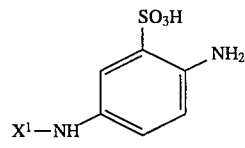 | 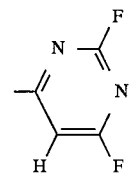 | 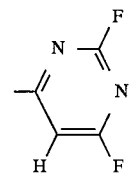 | Red-violet |
| 23 | 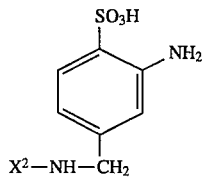 | " | " | Red |
| 24 | 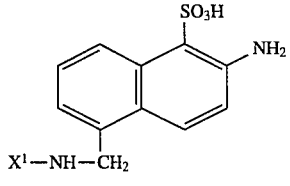 | " | " | Bluish red |

-continued

| | Diazo component | Coupling component | Z | Hue |
|---|---|---|---|---|
| 25 | 2-amino-benzenesulfonic acid with X¹—N(CH₃)—CH₂— substituent | 4-hydroxy-3-methyl-6-sulfo-8-(NH—Z)naphthalene-1-sulfonic acid | difluoropyrimidinyl (N=C(F)–N=C(F)–CH=) | Red |
| 26 | 2-amino-5-(X¹—NH—CH₂—)naphthalene-1-sulfonic acid | " | " | Red |
| 27 | 4-amino-6-(X⁴—HN—)benzene-1,3-disulfonic acid | " | " | Bluish red |
| 28 | 2-amino-4-(X³—NH—)benzenesulfonic acid | 4-hydroxy-3-methyl-6-sulfo-8-(NH—Z)naphthalene-1-sulfonic acid | difluoropyrimidinyl | Red |
| 29 | 2-amino-4-(X³—NH—)benzenesulfonic acid | 1-hydroxy-2-methyl-3-sulfo-6-(NH—Z)naphthalene | " | Scarlet |
| 30 | 2-amino-4-(X³—NH—CH₂—)benzenesulfonic acid | " | " | Orange |
| 31 | 4-amino-6-(X²—HN—)benzene-1,3-disulfonic acid | 1-hydroxy-2-methyl-3-sulfo-6-(NH—Z)naphthalene | difluoropyrimidinyl | Red |
| 32 | 2-amino-4-(X¹—NH—)benzenesulfonic acid | 1-hydroxy-2-methyl-3-sulfo-6-(NH—Z)naphthalene | " | Orange |

-continued

| | Diazo component | Coupling component | Z | Hue |
|---|---|---|---|---|
| 33 | 2-amino-4-(X¹—NH)-benzenesulfonic acid (SO₃H ortho to NH₂; X¹—NH at position 4) | 1-hydroxy-2-methyl-6-sulfo-8-(NH—CO—C₆H₄—NH—Z)-naphthalene-4-sulfonic acid | 2,6-difluoro-5-H-pyrimidin-4-yl (N=C(F)—CH=C(F)—N=) | Bluish red |
| 34 | 3-amino-4-sulfo-(X¹—NH—CH₂)-benzene (SO₃H, NH₂ on ring; X¹—NH—CH₂ substituent) | " | " | Red |
| 35 | 2-amino-4-(X²—HN)-benzene-1,5-disulfonic acid | 1-hydroxy-2-methyl-6-sulfo-8-(NH—CO—C₆H₄—NH—Z)-naphthalene-4-sulfonic acid | 2,6-difluoro-5-H-pyrimidin-4-yl | Bluish red |
| 36 | 2-amino-4-(X³—NH)-benzenesulfonic acid | 1-hydroxy-2-methyl-6-sulfo-8-(NH—CO—C₆H₄—NH—Z)-naphthalene-3-sulfonic acid | " | Red |
| 37 | 4-amino-(X¹—NH—CH₂CH₂SO₂)-benzene | 1-hydroxy-2-methyl-6-sulfo-8-(NH—Z)-naphthalene-3-sulfonic acid | " | Red |

EXAMPLE 38 a) 0.2 mol of 1-amino-8-hydroxynaphthalene-3,6-disulphonic acid is dissolved in 350 ml of water at a pH of 6.5, and the solution is cooled to 0° C. with 350 g of ice. 0.21 mol of 4-(2-chloroethylsulphonyl)-benzoyl chloride is added, and the pH is maintained between 4.0 and 4.5 with Na₂CO₃ solution. The temperature is allowed to rise to 20° to 25° C., and the mixture is stirred for another hour.

b) 0.2 mol of 2,6-difluoro-4-(3'-amino-4'-sulphophenyl)pyrimidine (prepared from 2,4-diaminobenzenesulphonic acid and 2,4,6-trifluoropyrimidine) is suspended in water, and 65 ml of 30% strength hydrochloric acid and 300 g of ice are added. 46 ml of 30% strength sodium nitrite solution are then added, and the mixture is stirred at 0° C. for 1 hour. Excess sodium nitrite is destroyed with sulphamic acid, and the diazotisation solution thus obtained is added to the solution of the coupling component a). The pH is brought to 6–7 with sodium carbonate solution.

After coupling is complete, the dyestuff is salted out, isolated, dried and milled. The dyestuff thus obtained of the formula

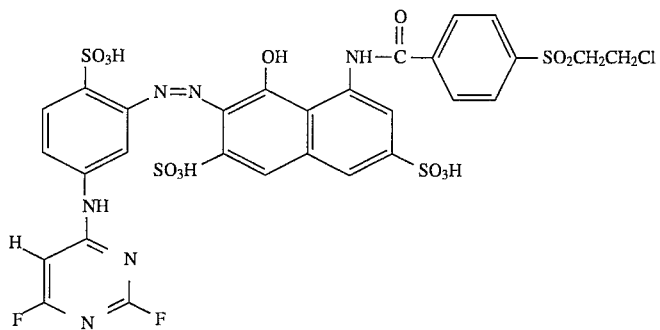

λ_max = 515 and 532 nm (H₂O)

dyes cotton in clear red shades.

EXAMPLE 39

0.2 mol of 8-(4'-amino-benzoylamino)-1-naphthol-3,6-disulphonic acid is dissolved in 800 ml of water at a pH of 7 using sodium carbonate solution (20 g/100 ml). The pH is brought to 4.5 with 10% strength HCl solution. 0.22 mol of 3-(2-chloroethylsulphonyl)-benzoyl chloride is added. The pH is maintained at 4.5–6 with sodium carbonate solution (20 g/100 ml). Reaction is complete after 4 hours.

0.2 mol of the diazonium salt from Example 38 is now added, while maintaining the pH at the same time at 7.5–8 by dropwise addition of sodium carbonate solution (20 g/100 ml). After coupling is complete, the product is salted out with NaCl, isolated and dried. The dyestuff of the formula

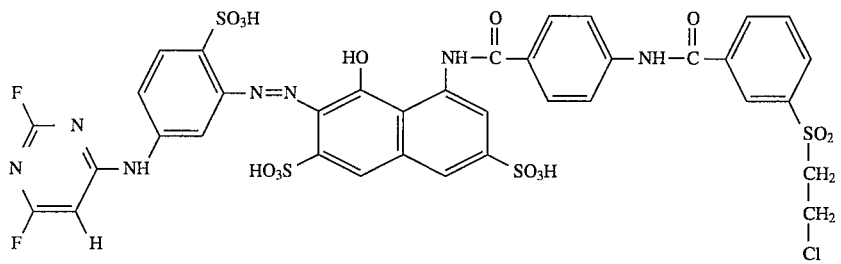

dyes cotton in red hues.

EXAMPLES 40–74 of the formula

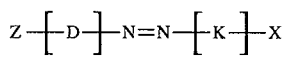

can be prepared as described in Example 38 or 39 by using the corresponding intermediates. They dye cotton in the hues given.

$X^1$ to $X^4$ have the abovementioned meaning.

| | Diazo component | Coupling component | Z | Hue |
|---|---|---|---|---|
| 40 | SO₃H, H, NH₂, Z—NH (benzene) | OH, NH—X¹, HO₃S, SO₃H (naphthalene) | N, N, Cl, F (pyrimidine) | Red λ_max = 514 nm 534 nm |
| 41 | SO₃H, NH₂, Z—NH (benzene) | OH, NH—X³, HO₃S, SO₃H (naphthalene) | N, N, Cl, F (pyrimidine) | Red-violet |

| | Diazo component | Coupling component | Z | Hue |
|---|---|---|---|---|
| 42 | 2-amino-4-(Z-N(CH3)-CH2)-benzenesulfonic acid | 4-OH, 5-NH-X¹, 3-methyl, 6,8-disulfo naphthalene | " | Red $\lambda_{max}$ = 513 nm 535 nm |
| 43 | 1-SO3H, 2-NH2, 5-(Z-HN-CH2) naphthalene | " | pyrimidine with F, Cl, F | Bluish red $\lambda_{max}$ = 522 nm 546 nm |
| 44 | 2-amino-4-(Z-N(CH3)-CH2)-benzenesulfonic acid | 4-OH, 8-NH-X¹, 3-methyl, 6-sulfo, 5-sulfo naphthalene | pyrimidine with F, Cl, F | Red $\lambda_{max}$ = 508 nm sh = 528 nm |
| 45 | 1-SO3H, 2-NH2, 5-(Z-HN-CH2) naphthalene | " | " | Red |
| 46 | 2-amino-5-(Z-HN)-1,4-benzenedisulfonic acid | " | " | Bluish red |
| 47 | 2-amino-4-(Z-NH)-benzenesulfonic acid | 4-OH, 8-NH-X¹, 3-methyl, 6-sulfo, 5-sulfo naphthalene | pyrimidine with Cl, F | Red |
| 48 | 2-amino-4-(Z-NH)-benzenesulfonic acid | 1-OH, 2-methyl, 3-sulfo, 6-NH-X² naphthalene | " | Scarlet |
| 49 | 2-amino-4-(Z-N(CH3)-CH2)-benzenesulfonic acid | " | " | Orange |

-continued

| | Diazo component | Coupling component | Z | Hue |
|---|---|---|---|---|
| 50 | 2-amino-5-(Z-HN)-benzene-1,4-disulfonic acid (SO₃H, NH₂, Z—HN, SO₃H) | 1-hydroxy-2-methyl-6-(NH—X¹)-naphthalene-3-sulfonic acid | pyrimidine with Cl and F (N=CH–N, =C(Cl)–C(F)=) | Red |
| 51 | 2-amino-4-(Z—NH)-benzenesulfonic acid | 1-hydroxy-2-methyl-6-(NH—X²)-naphthalene-3-sulfonic acid | " | Orange |
| 52 | 2-amino-4-(Z—NH)-benzenesulfonic acid | 1-hydroxy-2-methyl-6-(N(CH₃)—X¹)-naphthalene-3-sulfonic acid | pyrimidine with F, Cl, F | Orange |
| 53 | 2-amino-5-(Z—NH)-benzenesulfonic acid | 8-hydroxy-7-methyl-4-[4-(NH—X¹)-benzamido]-naphthalene-1,6-disulfonic acid | pyrimidine with Cl and F | Bluish red |
| 54 | 2-amino-4-[Z—N(CH₃)—CH₂]-benzenesulfonic acid | " | " | Red |
| 55 | 2-amino-5-(Z—HN—CH₂)-naphthalene-1-sulfonic acid | " | pyrimidine with F, Cl, F | Red |
| 56 | 2-amino-5-(Z—HN)-benzene-1,4-disulfonic acid | 8-hydroxy-7-methyl-4-[4-(NH—X⁴)-benzamido]-naphthalene-1,6-disulfonic acid | pyrimidine with Cl and F | Bluish red |
| 57 | 2-amino-4-(Z—NH)-benzenesulfonic acid | 8-hydroxy-7-methyl-4-[4-(NH—X²)-benzamido]-naphthalene-1,6-disulfonic acid | " | Red |

-continued

| | Diazo component | Coupling component | Z | Hue |
|---|---|---|---|---|
| 58 | Z—NH—CH₂CH₂SO₂—C₆H₄—NH₂ | naphthalene with OH, NH—X¹, CH₃, two SO₃H | " | Red |
| 59 | aminobenzene with SO₃H, NH₂, Z—NH | naphthalene with OH, NH—X³, CH₃, HO₃S, SO₃H | difluoropyrimidine (N=C(F)–N=C(F)–CH=) | Red-violet |
| 60 | benzene with SO₃H, NH₂, Z—NH—CH₂ | " | " | Red |
| 61 | naphthalene with SO₃H, NH₂, Z—HN—CH₂ | " | " | Bluish red |
| 62 | benzene with SO₃H, NH₂, Z—N(CH₃)—CH₂ | naphthalene with OH, NH—X¹, CH₃, SO₃H, SO₃H | difluoropyrimidine | Red |
| 63 | naphthalene with SO₃H, NH₂, Z—HN—CH₂ | " | " | Red |
| 64 | benzene with SO₃H, NH₂, SO₃H, Z—HN | " | " | Bluish red |
| 65 | benzene with SO₃H, NH₂, Z—NH | naphthalene with OH, NH—X¹, CH₃, SO₃H, SO₃H | difluoropyrimidine | Red λ$_{max}$ = 508 nm sh = 527 nm |
| 66 | benzene with SO₃H, NH₂, Z—NH | naphthalene with OH, CH₃, SO₃H, NH—X⁴ | " | Scarlet |

| | Diazo component | Coupling component | Z | Hue |
|---|---|---|---|---|
| 67 | 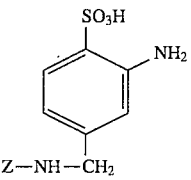 | " | " | Orange |
| 68 | 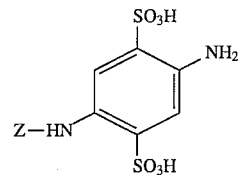 | 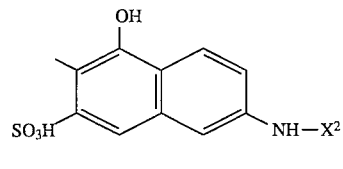 | 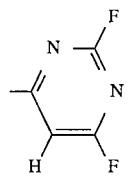 | Red |
| 69 | 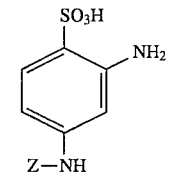 | 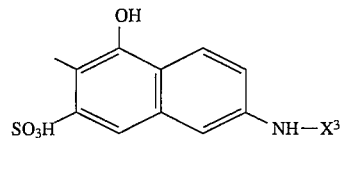 | " | Orange |
| 70 | 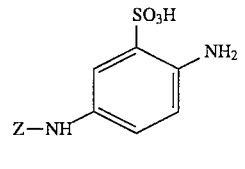 | 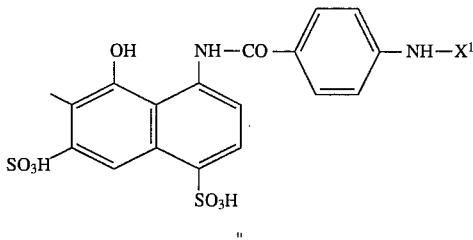 | 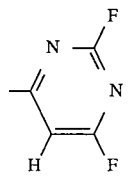 | Bluish red |
| 71 | 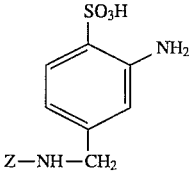 | " | " | Red |
| 72 | 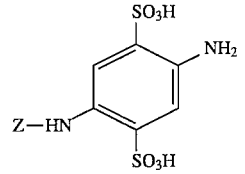 | 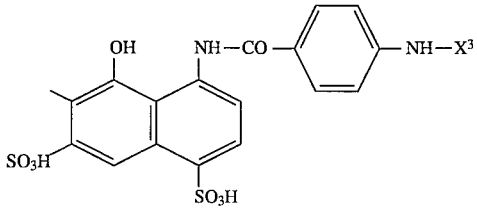 | 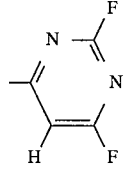 | Bluish red |
| 73 | 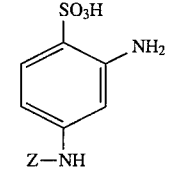 | 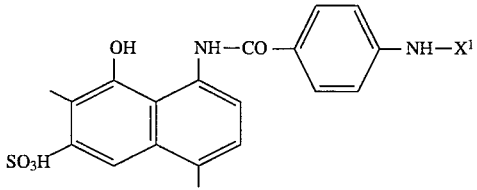 | " | Red |
| 74 | 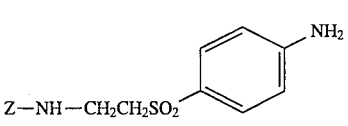 | 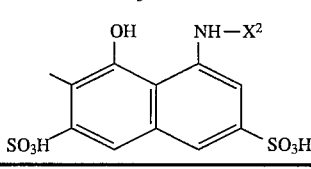 | " | Red |

Further valuable dyestuffs of the formula
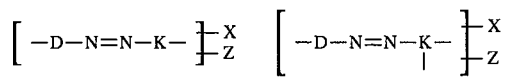
are those of Examples 75–86, which can be prepared by known methods, such as, for example, described above, and dye cotton in the hues given.

| Ex. | X | Diazo component | K | Z | Hue |
|---|---|---|---|---|---|
| 75 | 3-(SO₂CH₂CH₂Cl)-benzoyl | 4-SO₃H, 3-NH₂, (Z—NH)-phenyl | 4-methyl-2-(NHCOCH₃)-phenyl-NH—X | difluorotriazinyl (F, F, H on the vinyl positions) | Golden yellow |
| 76 | 4-(SO₂C₂H₄Cl)-benzoyl | 1-SO₃H, 2-NH₂, 5-(X—NH—CH₂)-naphthyl | 4-methyl-2-(NHCOCH₃)-phenyl-NH—Z | difluorotriazinyl (F, F, H) | Golden yellow |
| 77 | " | 1-SO₃H, 5-SO₃H, 3-NH₂, 7-(X—NH)-naphthyl | 4-methyl-2-(NHCOCH₃)-phenyl-NH—Z | chlorofluorotriazinyl (F, F, Cl vinyl; H on N) | Reddish yellow |
| 78 | 4-(SO₂C₂H₄Cl)-benzoyl | 1-SO₃H, 5-SO₃H, 3-NH₂, 7-(Z—NH)-naphthyl | 4-methyl-2-(NHCOCH₃)-phenyl-NH—X | chlorofluorotriazinyl (F, F, Cl; F on N) | Reddish yellow |
| 79 | " | " | 4,6-disulfo-1-OH-8-(NH—X)-naphthyl | chlorofluorotriazinyl (F, F, Cl; H on N) | Bluish red |

-continued

| Ex. | X | Diazo component | K | Z | Hue |
|---|---|---|---|---|---|
| 80 | 3-(SO$_2$CH$_2$CH$_2$Cl)-C$_6$H$_4$-C(O)- | naphthalene with SO$_3$H, NH$_2$, X—NH, Z—NH substituents | 2-methyl-3-sulfo-6-(NH—Z)-naphthalen-1-ol | monofluorotriazine (2,6-difluoro) | Orange |
| 81 | 4-(SO$_2$CH$_2$CH$_2$Cl)-C$_6$H$_4$-C(O)- | 2-amino-1-(2H-naphtho[1,2-d]triazol-2-yl)benzene-...-sulfonic acid derivative with Z—NH, HO$_3$S, SO$_3$H | 8-(NH—X)-1-hydroxy-7-methyl-3-sulfonaphthalene | 5-chloro-2,4-difluoropyrimidine | Violet |
| 82 | " | " | pyridone: 1-(CH$_2$CH$_2$—NH—X), 3-(CH$_2$—SO$_3$H), 4-CH$_3$, 6-OH | 5-H-2,4-difluoropyrimidine (chloro) | Yellow |
| 83 | " | 4-aminophenyl (NH$_2$) | | " | Golden yellow |
| 84 | 4-(SO$_2$CH$_2$CH$_2$Cl)-C$_6$H$_4$-C(O)- | 2-amino-6-(Z—NHCH$_2$CH$_2$SO$_2$)-1-sulfonaphthalene | 2-methyl-5-acetamidoaniline (NH—X) | 5-chloro-2-fluoropyrimidine | Golden yellow |
| 85 | 3-(SO$_2$CH$_2$CH$_2$Cl)-C$_6$H$_4$-C(O)- | 2-amino-6-(X—NHCH$_2$CH$_2$SO$_2$)-1-sulfonaphthalene | 2-methyl-5-acetamidoaniline (NH—Z) | 5-chloro-2-fluoropyrimidine | Golden yellow |

| Ex. | X | Diazo component | K | Z | Hue |
|---|---|---|---|---|---|
| 86 | " | 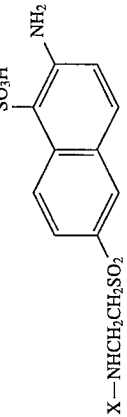 X—NHCH$_2$CH$_2$SO$_2$ |  | | Golden yellow |

The dyestuffs of Examples 87–105 can be obtained analogously to the preparation processes described above or by customary processes using the corresponding starting components.
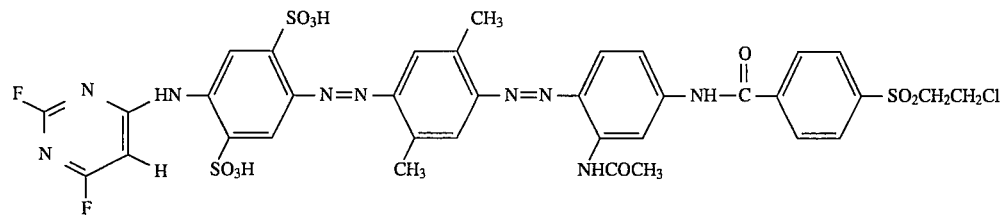
87
Yellow-brown
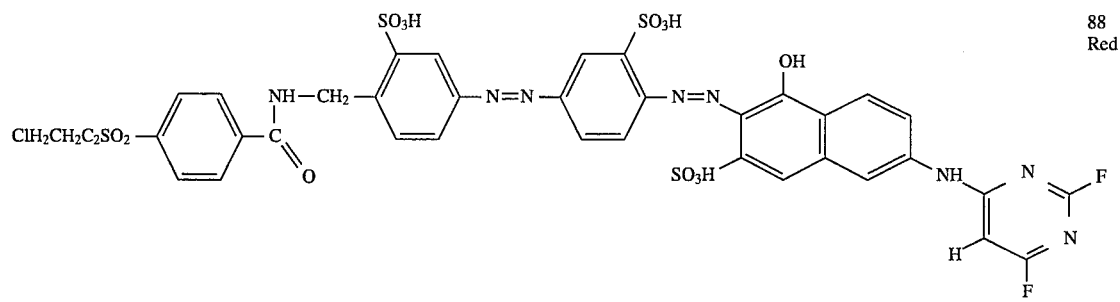
88
Red
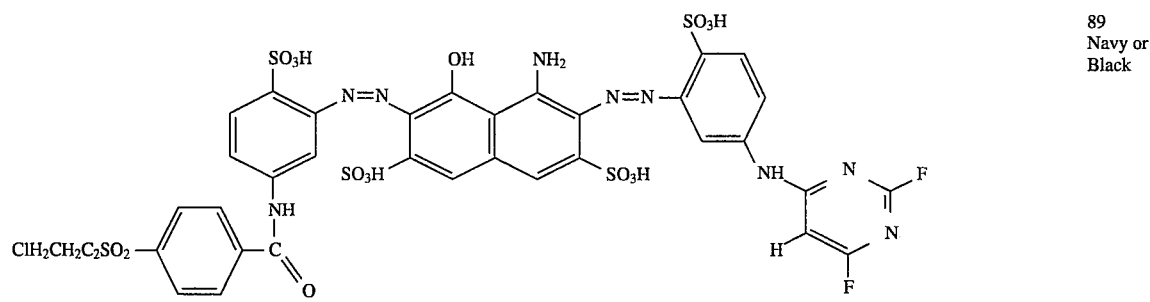
89
Navy or Black
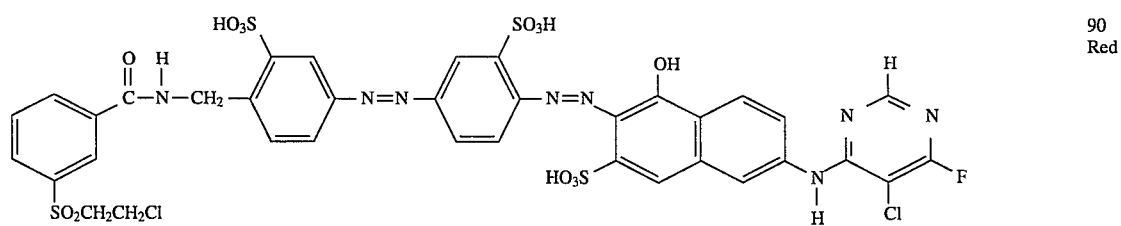
90
Red
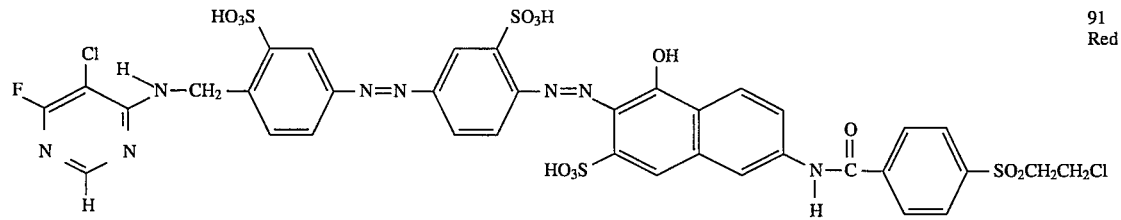
91
Red
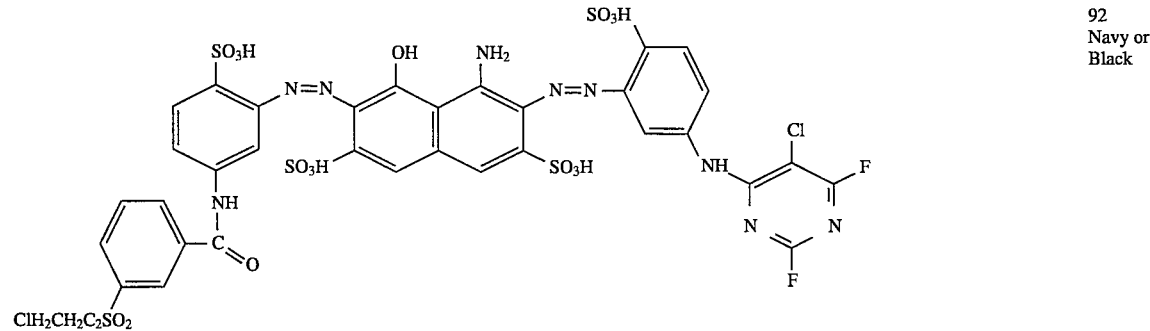
92
Navy or Black

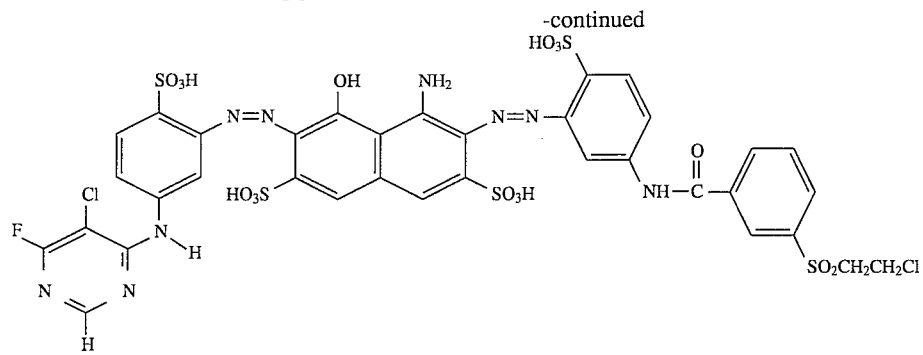
93 Navy or Black
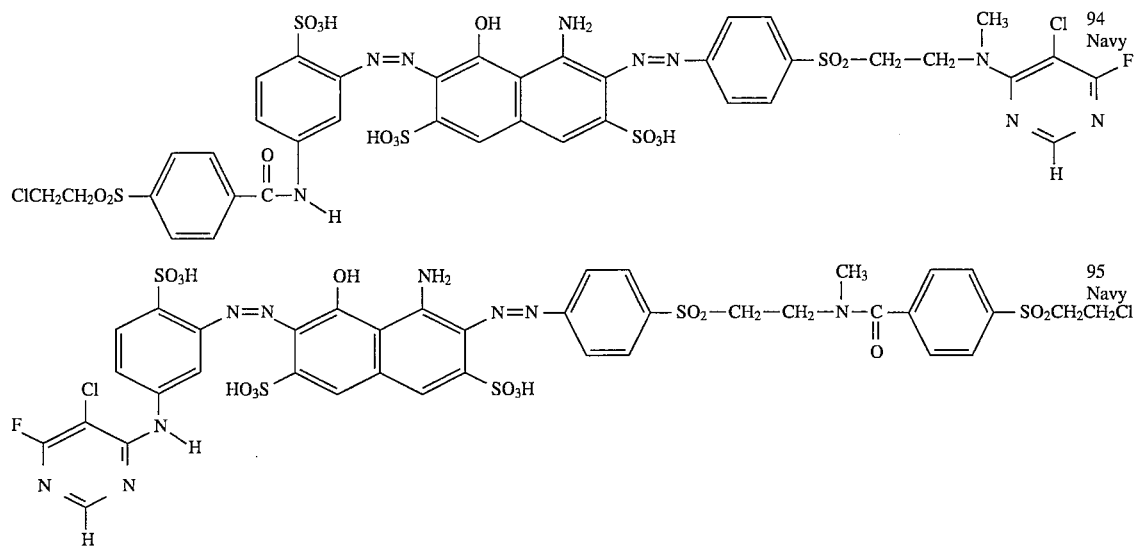
94 Navy
95 Navy
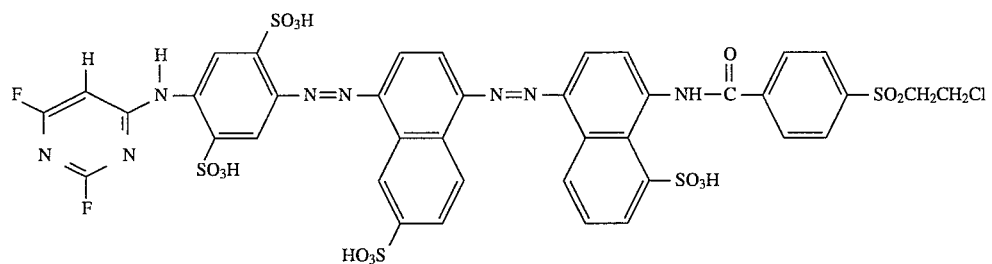
96 Brown
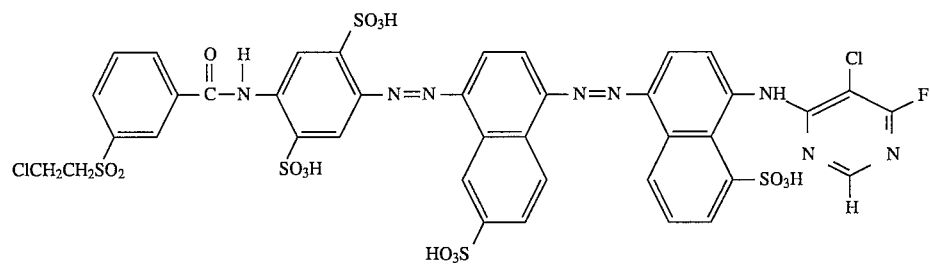
97 Brown
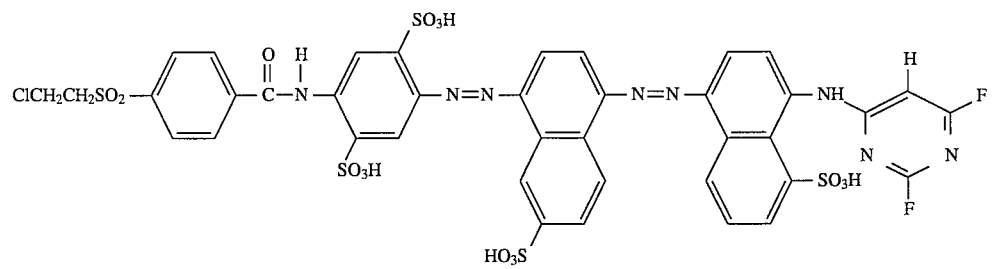
98 Brown

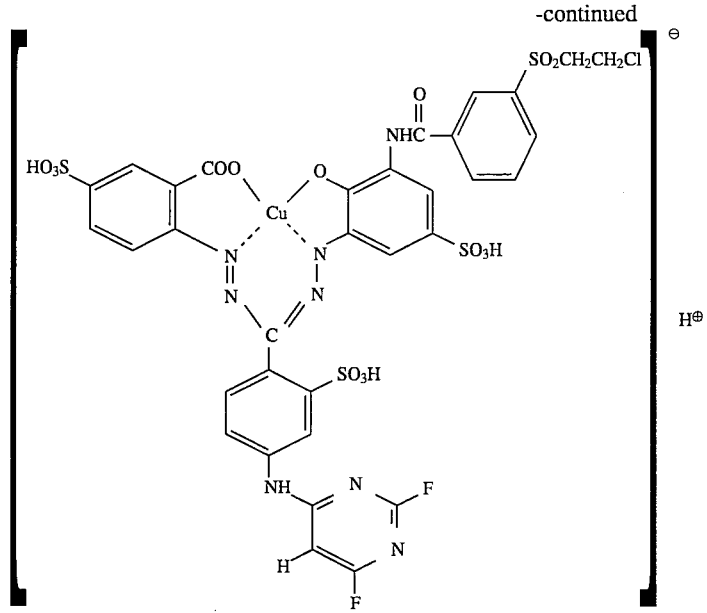
99
Blue
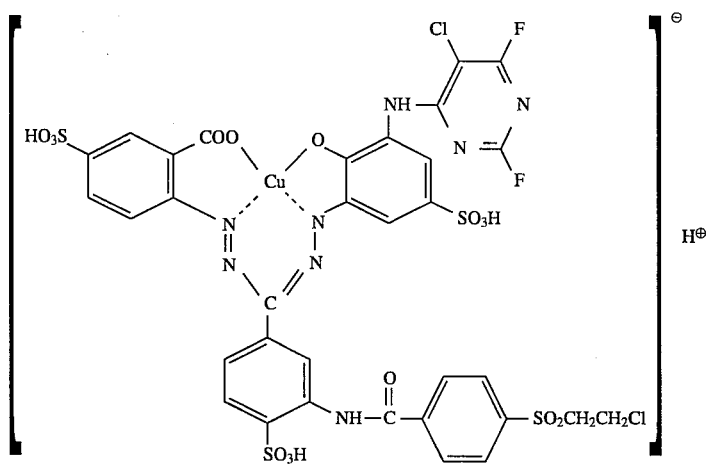
100
Blue
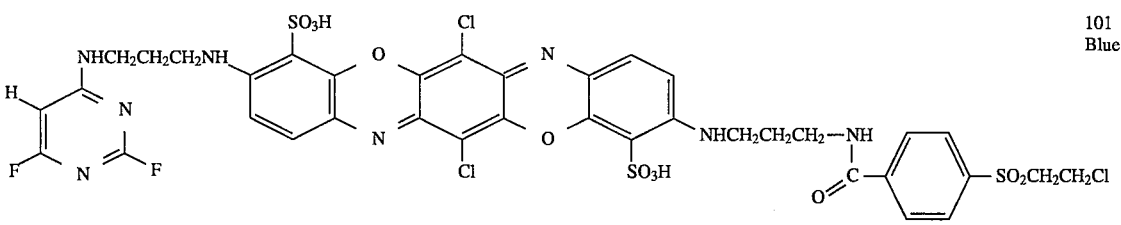
101
Blue
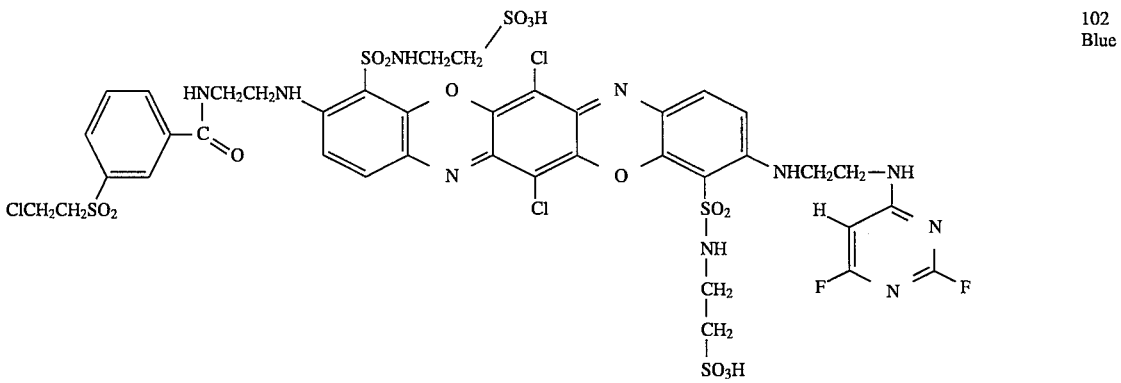
102
Blue -continued
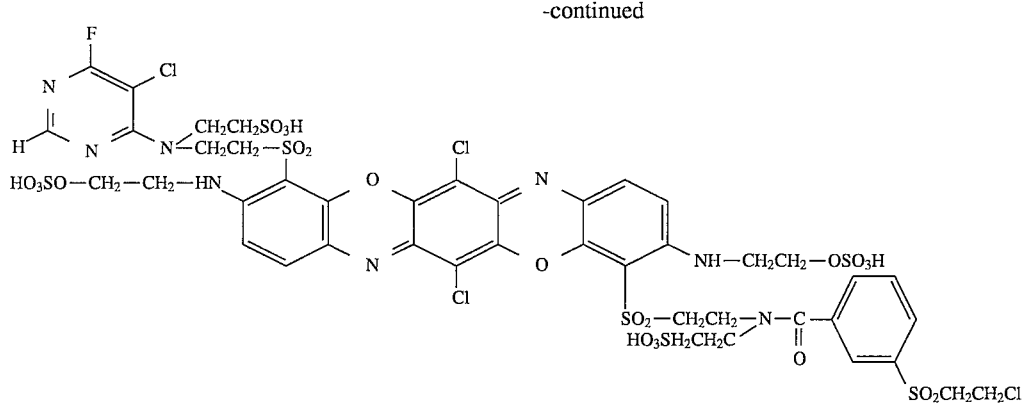
103
Blue
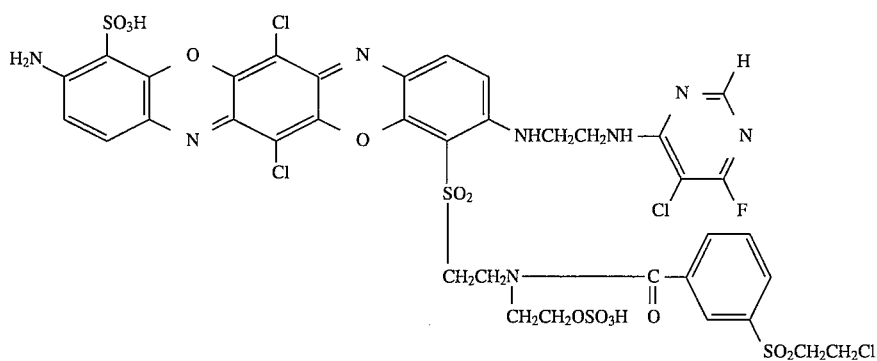
104
Blue
We claim:
1. A dyestuff of the formula
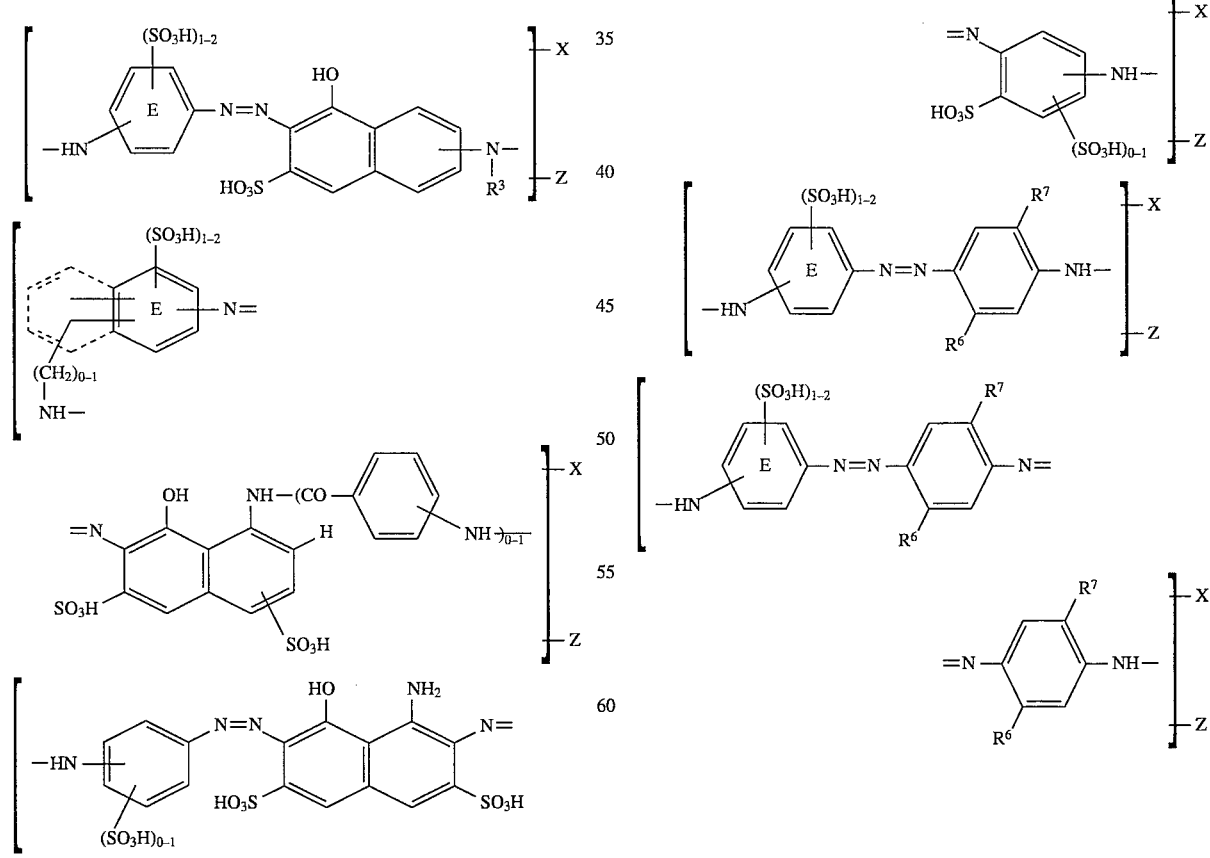

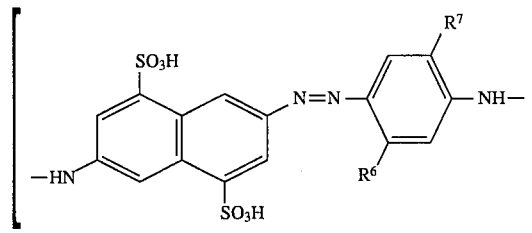
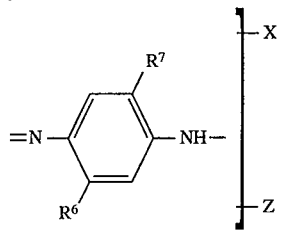
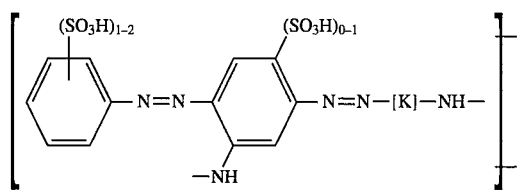
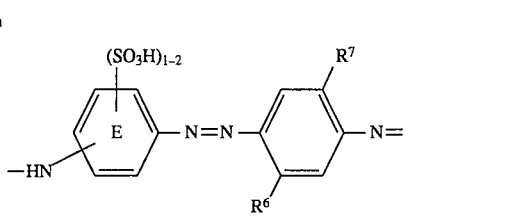
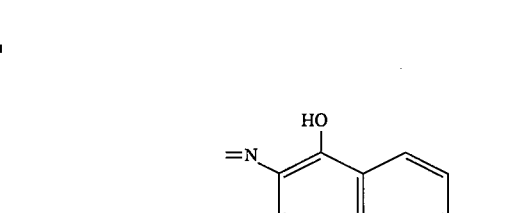
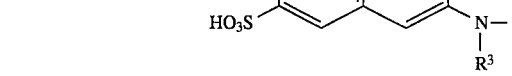
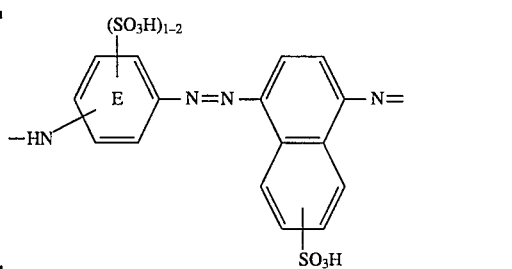
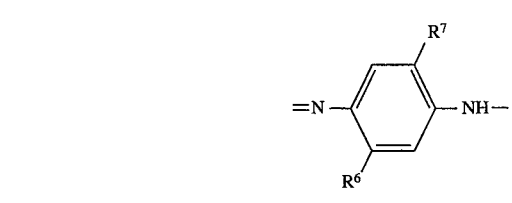
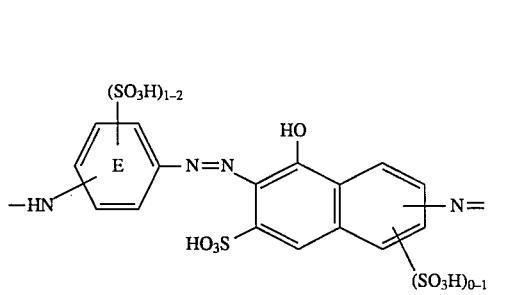
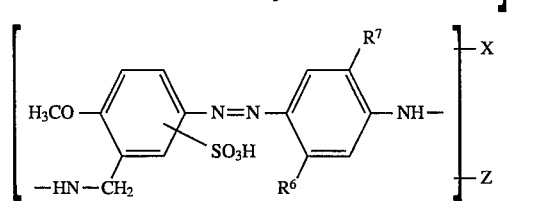

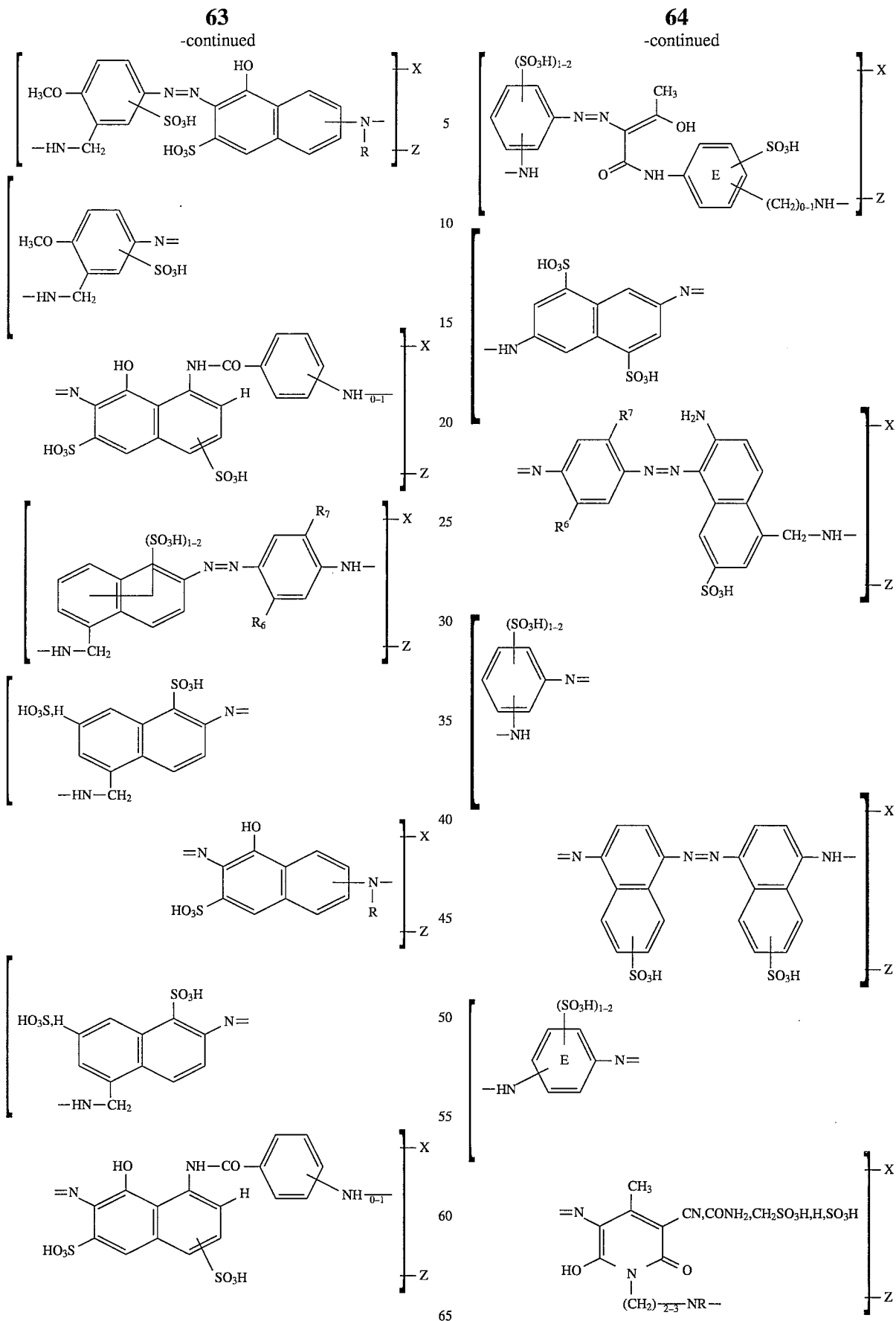

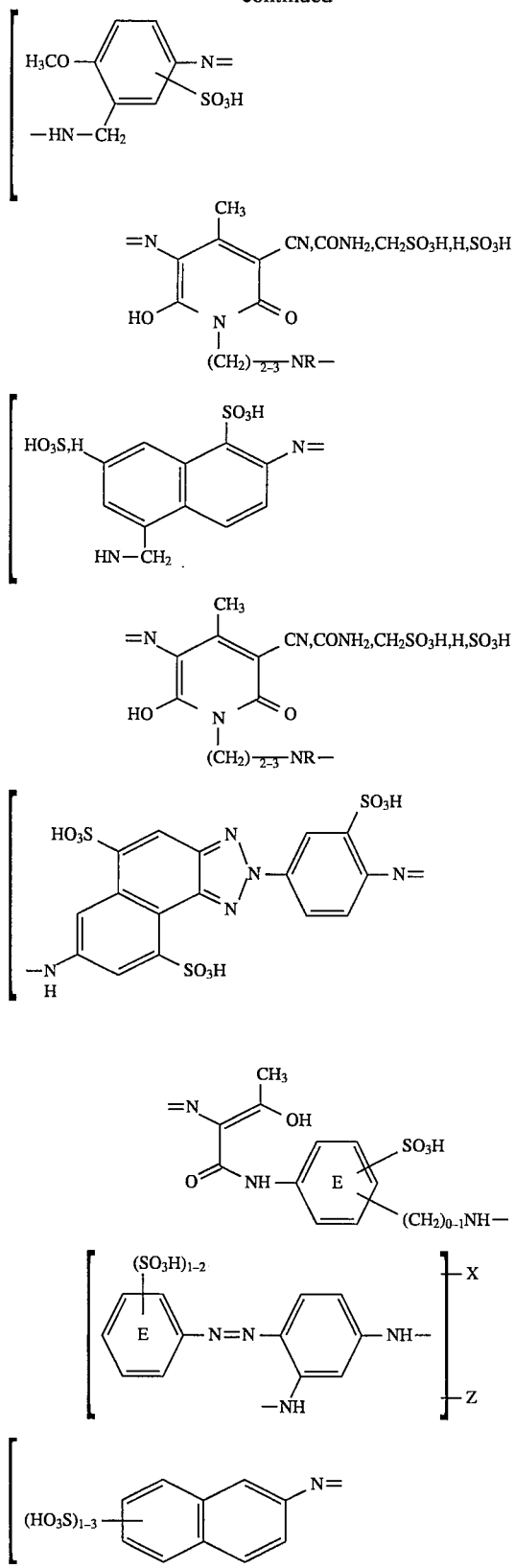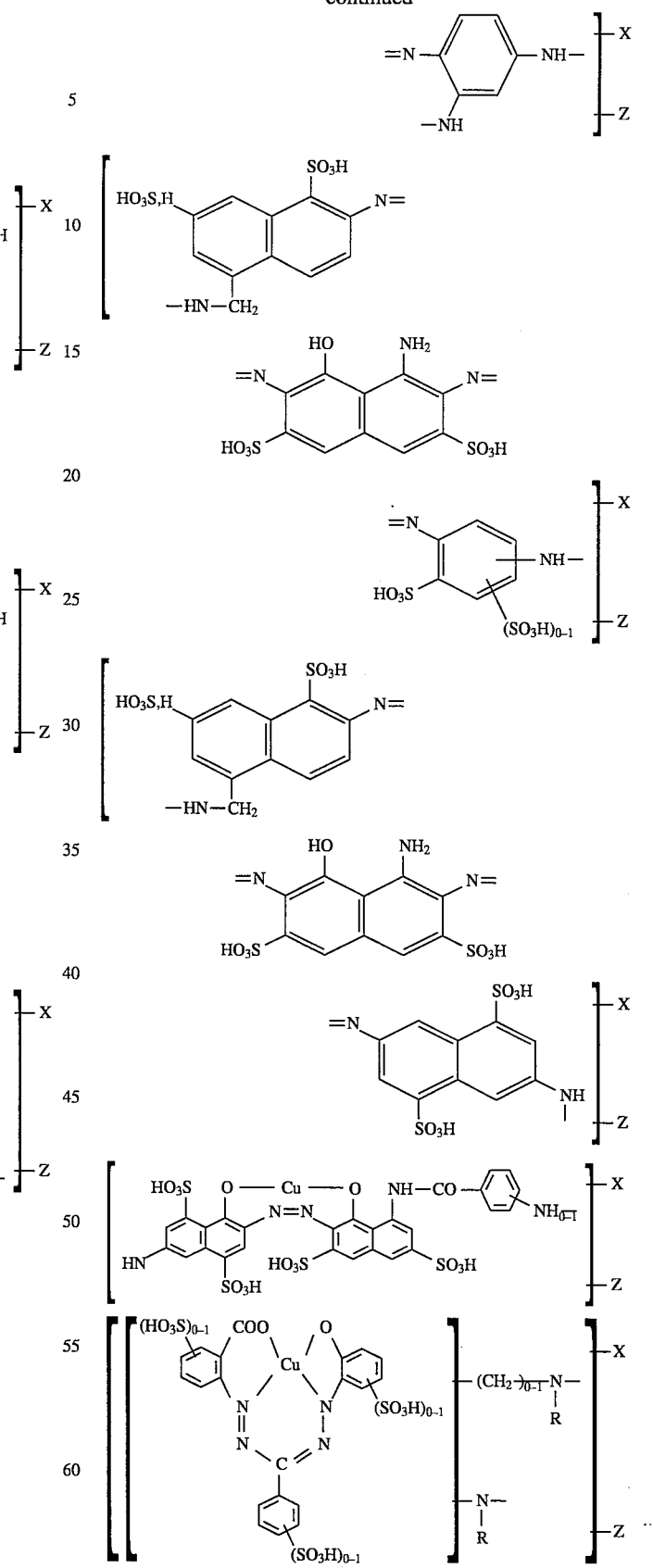

-continued

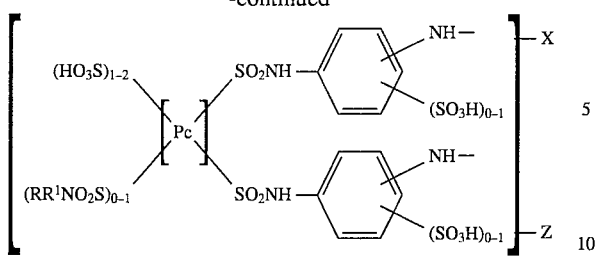

in which Pc represents a Cu phthalocyanine or Ni phthalocyanine radical and the total number of substituents on the Pc skeleton is at most 4,

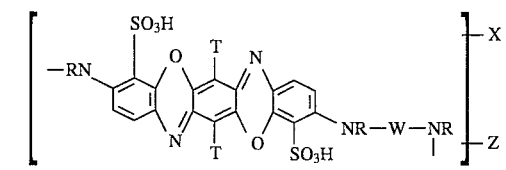

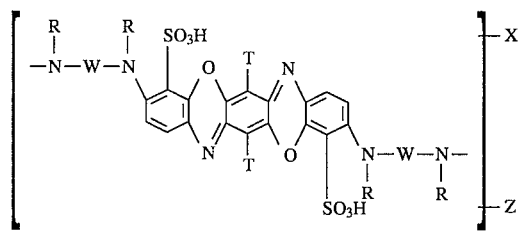

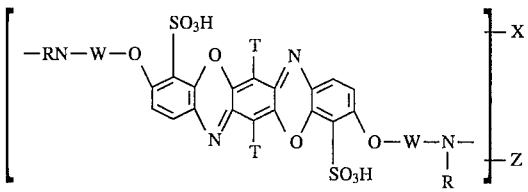

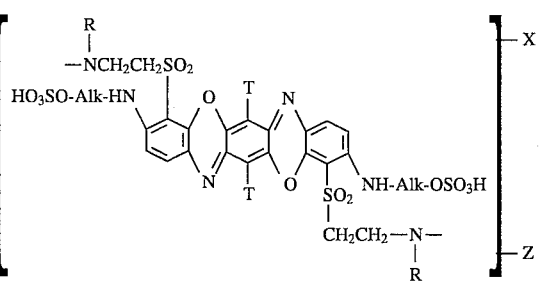

in which

R, $R^1$ are, independently of one another, H, substituted or unsubstituted $C_1$–$C_6$-alkyl, $R^3$ is H, $CH_3$ or $C_2H_5$ $R^6$ is H, $C_1$–$C_4$-alkyl, $C_1$–$C_4$-alkoxy, acylamino, $C_1$–$C_4$-alkylcarbonylamino, $C_1$–$C_4$-alkylsulphonylamino, aminocarbonylamino, phenylcarbonylamino, Cl or Br, $R^7$ is H, $C_1$–$C_4$-alkyl, $C_1$–$C_4$-alkoxy, OH or $SO_3H$, W is an aliphatic bridging member, K is the radical of a coupling component from the hydroxybenzene, hydroxynaphthalene, aminobenzene, aminonaphthalene, aminohydroxynaphthalene series, a 5-hydroxy-3-methyl (or carboxy)-pyrazolone, a 6-hydroxy-2-pyridone or an acetoacetic arylide radical which is unsubstituted or ring-substituted by $C_1$–$C_4$-alkyl or $C_1$–$C_4$-alkoxy, X is

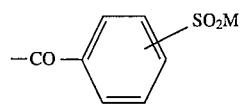

M is $CH=CH_2$ or $CH_2CH_2V$, in which

V is OH or a radical which can be eliminated by alkali,

Z is a fibre-reactive fluorine-containing 4-pyrimidyl radical

T is Cl, Br or —$OCH_3$

Alk is straight-chain or branched $C_1$–$C_6$-alkylene, which may be interrupted by hetero atoms or groupings containing hetero atoms selected from the group consisting of NR, O and S, and wherein the benzene rings E may be further substituted by $CH_3$, $C_2H_5$, $CH_3O$, $C_2H_5O$, halogen or $CO_2H$.

2. A dyestuff according to claim 1, characterised in that M is $CH=CH_2$, $CH_2CH_2Cl$ or $CH_2CH_2OSO_3H$.

3. A dyestuff of claim 1, in which Z represents

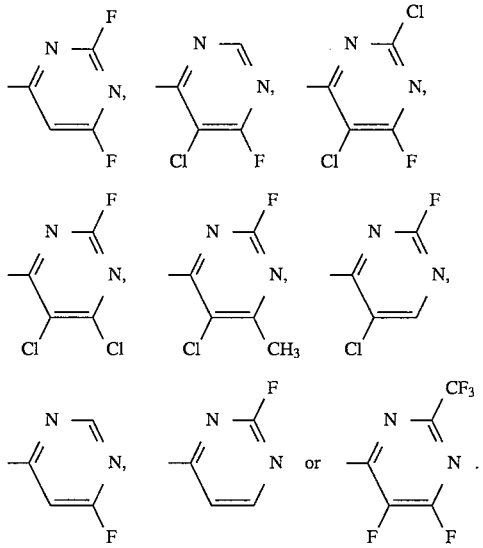

4. A dyestuff of claim 1 of the formula

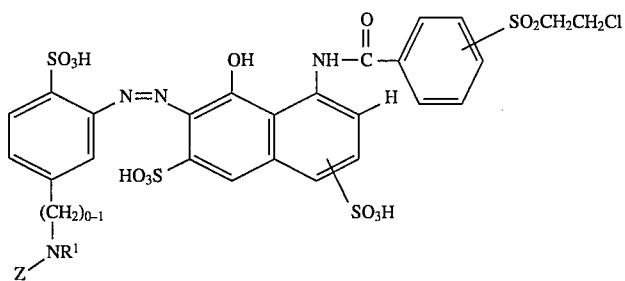
in which
R¹ has the meaning given in claim 1 and
Z represents
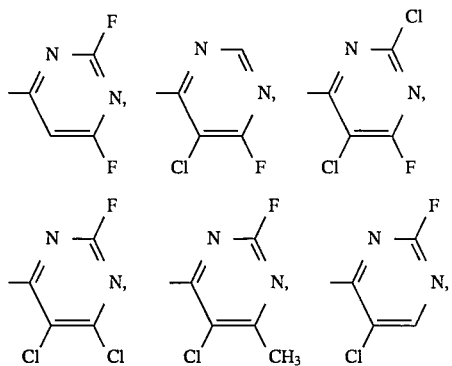
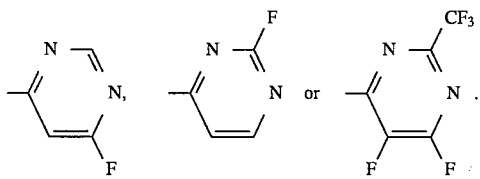
5. Process for the dyeing and printing of hydroxyl- and amido-containing materials by applying thereto dyestuffs of claim 1.
* * * * *

UNITED STATES PATENT AND TRADEMARK OFFICE
CERTIFICATE OF CORRECTION

PATENT NO.  : 5,591,834
DATED       : January 7, 1997
INVENTOR(S) : Bootz, et al.

It is certified that error appears in the above-indentified patent and that said Letters Patent is hereby corrected as shown below:

Col. 61, line 36    Delete " $R^3$ " and substitute -- R --

Col. 66, last formula delete "
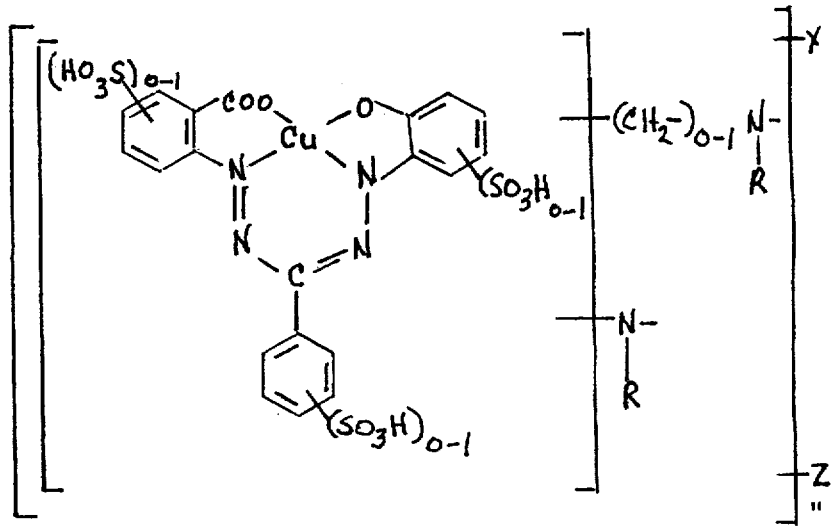
"

and substitute

UNITED STATES PATENT AND TRADEMARK OFFICE
CERTIFICATE OF CORRECTION

PATENT NO. : 5,591,834
DATED      : January 7, 1997
INVENTOR(S) : Bootz, et al.

It is certified that error appears in the above-indentified patent and that said Letters Patent is hereby corrected as shown below:

Col. 66, last formula cont'

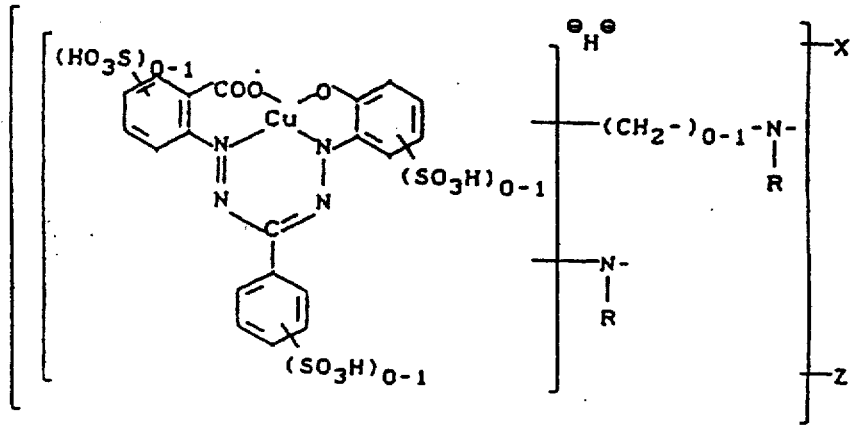

Signed and Sealed this

Fifth Day of August, 1997

Attest:

BRUCE LEHMAN

Attesting Officer    Commissioner of Patents and Trademarks